(12) United States Patent
Koper et al.

(10) Patent No.: US 11,746,815 B2
(45) Date of Patent: Sep. 5, 2023

(54) STAPLE AND STAPLE COLLATION

(71) Applicant: MILWAUKEE ELECTRIC TOOL CORPORATION, Brookfield, WI (US)

(72) Inventors: David S. Koper, Milwaukee, WI (US); Nathan Bandy, Wauwatosa, WI (US); Andrew R. Wyler, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 50 days.

(21) Appl. No.: 17/482,061

(22) Filed: Sep. 22, 2021

(65) Prior Publication Data

US 2022/0090618 A1 Mar. 24, 2022

Related U.S. Application Data

(60) Provisional application No. 63/081,432, filed on Sep. 22, 2020.

(51) Int. Cl.
*F16B 15/08* (2006.01)
*F16B 15/00* (2006.01)

(52) U.S. Cl.
CPC .......... *F16B 15/08* (2013.01); *F16B 15/0015* (2013.01)

(58) Field of Classification Search
CPC ............................. F16B 15/08; F16B 15/0015
See application file for complete search history.

(56) References Cited

U.S. PATENT DOCUMENTS

| 19,747 | A | | 3/1858 | Boardman |
| 54,283 | A | | 5/1866 | Boardman |
| 274,481 | A | * | 3/1883 | Frost ................... F16B 15/0015 16/13 |
| D30,896 | S | | 5/1899 | La Prelle |
| 957,756 | A | | 5/1910 | Emanuel |
| 1,201,559 | A | | 10/1916 | Columbia |
| 1,217,968 | A | | 3/1917 | Lotz et al. |
| 1,310,908 | A | | 7/1919 | Gilbert |
| 1,311,903 | A | | 8/1919 | Leschander |
| 1,478,932 | A | | 12/1923 | Wetz et al. |
| 1,510,360 | A | | 9/1924 | Rijmenam |
| 1,543,764 | A | | 6/1925 | Garford |

(Continued)

FOREIGN PATENT DOCUMENTS

| CN | 207892959 U | 9/2018 |
| CN | 208734685 U | 4/2019 |

(Continued)

OTHER PUBLICATIONS

International Search Report and Written Opinion for Application No. PCT/US2021/051541 dated Jan. 5, 2022 (11 pages).

*Primary Examiner* — Nathaniel C Chukwurah

(74) *Attorney, Agent, or Firm* — Michael Best & Friedrich LLP

(57) ABSTRACT

A staple collation includes a first staple, an identical second staple adjacent the first staple, and an adhesive material coupling the first staple to the second staple. Each of the first staple and the second staple includes a crown section having opposite ends and a pair of leg sections extending from the opposite ends of the crown section. The second staple is offset from the first staple in a first, lateral direction, and the second staple is offset from the first staple in a second, vertical direction that is perpendicular to the lateral direction.

31 Claims, 17 Drawing Sheets

(56) References Cited

U.S. PATENT DOCUMENTS

| | | | |
|---|---|---|---|
| 2,033,613 A | 3/1936 | Crosby | |
| 2,067,359 A | 1/1937 | Tumminello | |
| 2,111,404 A | 3/1938 | Pankonin | |
| 2,122,814 A | 7/1938 | Hansen | |
| 2,140,593 A | 12/1938 | Pankonin | |
| 2,275,683 A | 3/1942 | Rutledge | |
| 2,283,814 A | 5/1942 | Place | |
| 2,433,914 A | 1/1948 | Lang | |
| 2,528,685 A | 11/1950 | Brown | |
| 2,641,154 A * | 6/1953 | Heller | F16B 15/04 411/448 |
| 2,867,807 A | 1/1959 | Anstett | |
| 3,128,667 A | 4/1964 | Tremblay | |
| 3,510,043 A | 5/1970 | Larson | |
| 3,611,708 A | 10/1971 | Moore et al. | |
| 3,618,447 A | 11/1971 | Goins | |
| 3,757,629 A | 9/1973 | Scheider | |
| 3,788,187 A | 1/1974 | Knohl | |
| 3,800,653 A | 4/1974 | Barth et al. | |
| 3,800,654 A | 4/1974 | Larson | |
| 3,811,269 A | 5/1974 | Larson | |
| 3,813,985 A | 6/1974 | Perkins | |
| 3,840,165 A | 10/1974 | Howard | |
| 3,855,688 A | 12/1974 | Knohl | |
| 3,871,152 A | 3/1975 | Lindeman | |
| 3,874,263 A | 4/1975 | Barth et al. | |
| 3,945,293 A | 3/1976 | Krol | |
| 3,969,975 A * | 7/1976 | Krol | F16B 15/06 411/456 |
| 4,014,244 A | 3/1977 | Larson | |
| 4,114,859 A | 9/1978 | Stenson | |
| 4,220,070 A | 9/1980 | Anstett | |
| 4,263,830 A | 4/1981 | Burstrom | |
| 4,265,160 A | 5/1981 | Martinez | |
| 4,454,875 A | 6/1984 | Pratt et al. | |
| 4,470,531 A | 9/1984 | Anstett | |
| 4,570,623 A | 2/1986 | Ellison et al. | |
| 4,621,758 A | 11/1986 | Anstett | |
| 4,697,045 A | 9/1987 | Beatty | |
| 4,724,839 A | 2/1988 | Bedi et al. | |
| D298,916 S | 12/1988 | Beatty | |
| 4,836,372 A | 6/1989 | Shelton | |
| 5,053,038 A | 10/1991 | Sheehan | |
| 5,058,315 A | 10/1991 | Wagner | |
| 5,137,112 A | 8/1992 | Nichols | |
| 5,140,715 A | 8/1992 | Monacelli | |
| 5,211,722 A | 5/1993 | Wagner | |
| 5,223,675 A | 6/1993 | Taft | |
| 5,441,373 A | 8/1995 | Kish et al. | |
| D397,929 S | 9/1998 | Stridh | |
| D402,540 S | 12/1998 | Stridh | |
| 5,884,829 A | 3/1999 | Wingert | |
| 6,007,512 A | 12/1999 | Hooven et al. | |
| 6,071,053 A | 6/2000 | Kuhns | |
| 6,095,737 A | 8/2000 | Barker et al. | |
| 6,126,372 A | 10/2000 | Takata | |
| 6,386,811 B2 | 5/2002 | Almeras et al. | |
| 6,554,852 B1 | 4/2003 | Oberlander | |
| D484,032 S | 12/2003 | Del Re | |
| 6,915,937 B2 | 7/2005 | Lat et al. | |
| 6,957,756 B2 | 10/2005 | Lat et al. | |
| 7,104,741 B2 | 9/2006 | Krohn | |
| 7,108,709 B2 | 9/2006 | Cummins | |
| D572,363 S | 7/2008 | Menn | |
| 7,794,475 B2 | 9/2010 | Hess et al. | |
| 7,887,563 B2 | 2/2011 | Cummins | |
| 7,918,374 B2 | 4/2011 | Gardner et al. | |
| 7,918,873 B2 | 4/2011 | Cummins | |
| 8,083,454 B2 | 12/2011 | Doole | |
| 8,109,386 B2 | 2/2012 | Krohn | |
| 8,523,506 B2 | 9/2013 | MacDonald et al. | |
| 8,679,123 B2 | 3/2014 | Kinmon et al. | |
| 8,728,099 B2 | 5/2014 | Cohn et al. | |
| 8,728,119 B2 | 5/2014 | Cummins | |
| 8,729,098 B2 | 5/2014 | Daniel et al. | |
| 8,808,325 B2 | 8/2014 | Hess et al. | |
| 8,888,826 B2 | 11/2014 | Kinmon et al. | |
| 8,894,669 B2 | 11/2014 | Nering et al. | |
| 9,055,945 B2 | 6/2015 | Miksza et al. | |
| 9,107,661 B2 | 8/2015 | Euteneuer et al. | |
| 9,121,427 B2 * | 9/2015 | Young | B25C 5/0257 |
| 9,125,650 B2 | 9/2015 | Euteneuer et al. | |
| 9,657,761 B2 | 5/2017 | Yang et al. | |
| 9,796,072 B2 | 10/2017 | Young | |
| 10,130,359 B2 | 11/2018 | Hess et al. | |
| 10,443,642 B2 | 10/2019 | Smeaton et al. | |
| D871,199 S | 12/2019 | Parker et al. | |
| 10,563,685 B2 | 2/2020 | Tao | |
| 2003/0021655 A1 | 1/2003 | Correll et al. | |
| 2004/0250505 A1 | 12/2004 | Leek et al. | |
| 2004/0262461 A1 | 12/2004 | Del Re et al. | |
| 2005/0145666 A1 | 7/2005 | Lat et al. | |
| 2007/0160443 A1 | 7/2007 | Tseng | |
| 2008/0179371 A1 | 7/2008 | Gardner et al. | |
| 2010/0312275 A1 | 12/2010 | Euteneuer et al. | |
| 2011/0079627 A1 | 4/2011 | Cardinale et al. | |
| 2013/0153628 A1 | 6/2013 | Euteneuer | |
| 2015/0036949 A1 | 2/2015 | Lasagna et al. | |
| 2015/0063940 A1 | 3/2015 | Marczynski | |
| 2018/0347610 A1 | 12/2018 | Zuk | |
| 2019/0120271 A1 | 4/2019 | Parker et al. | |

FOREIGN PATENT DOCUMENTS

| | | |
|---|---|---|
| DE | 1930490 A1 | 12/1970 |
| DE | 2356883 A1 | 5/1974 |
| DE | 8612162 U1 | 6/1986 |
| DE | 4123645 A1 | 1/1993 |
| DE | 10109962 A1 | 9/2002 |
| DE | 10358442 A1 | 7/2005 |
| DE | 202005008988 U1 | 5/2006 |
| DE | 102011013292 A1 | 9/2012 |
| DE | 202013006362 U1 | 8/2013 |
| DE | 202014000807 U1 | 3/2014 |
| DE | 102013011804 A1 | 1/2015 |
| EP | 0798503 A2 | 10/1997 |
| EP | 1364750 A2 | 11/2003 |
| EP | 2400197 A1 | 12/2011 |
| WO | 8800168 A1 | 1/1988 |
| WO | 2012169734 A2 | 12/2012 |
| WO | 2019067776 A | 4/2019 |

* cited by examiner

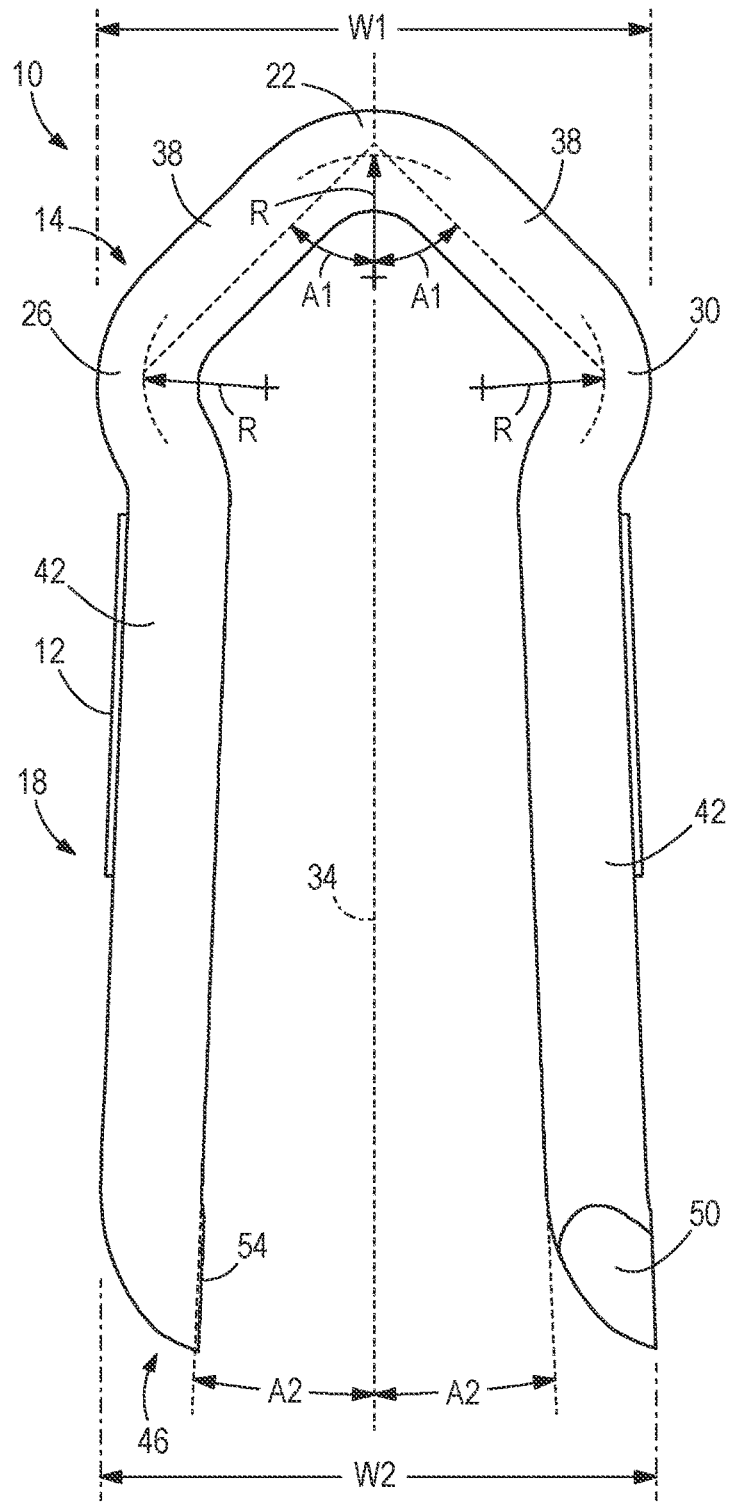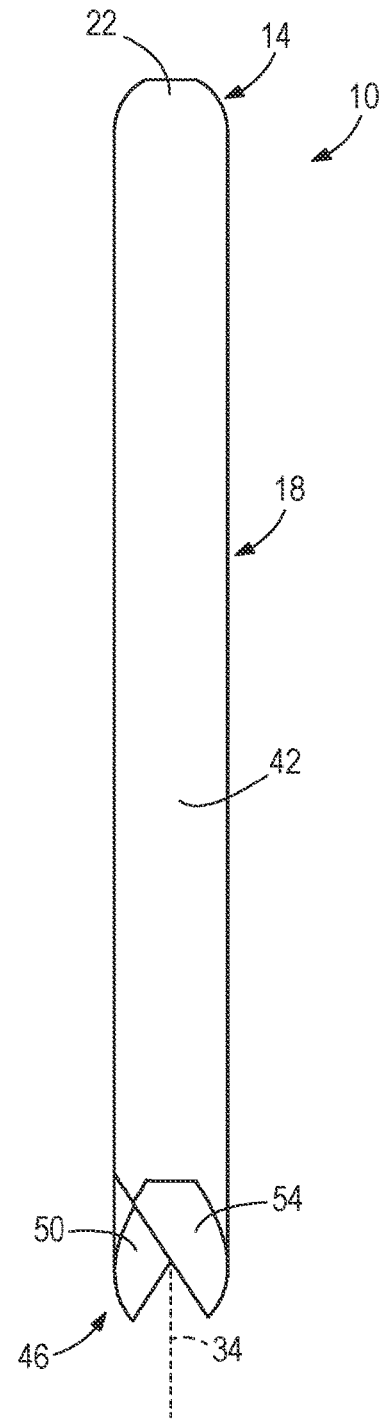
FIG. 2
FIG. 3

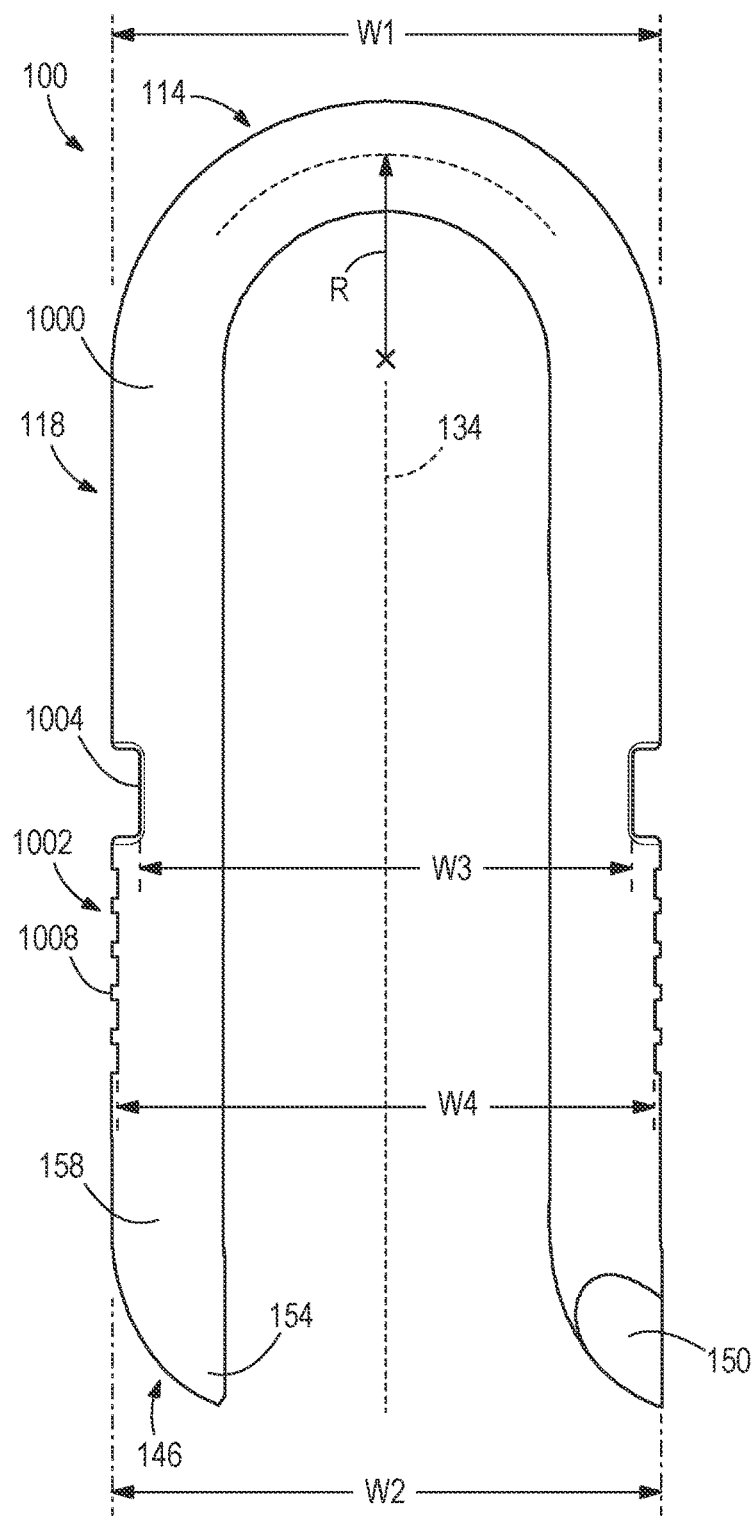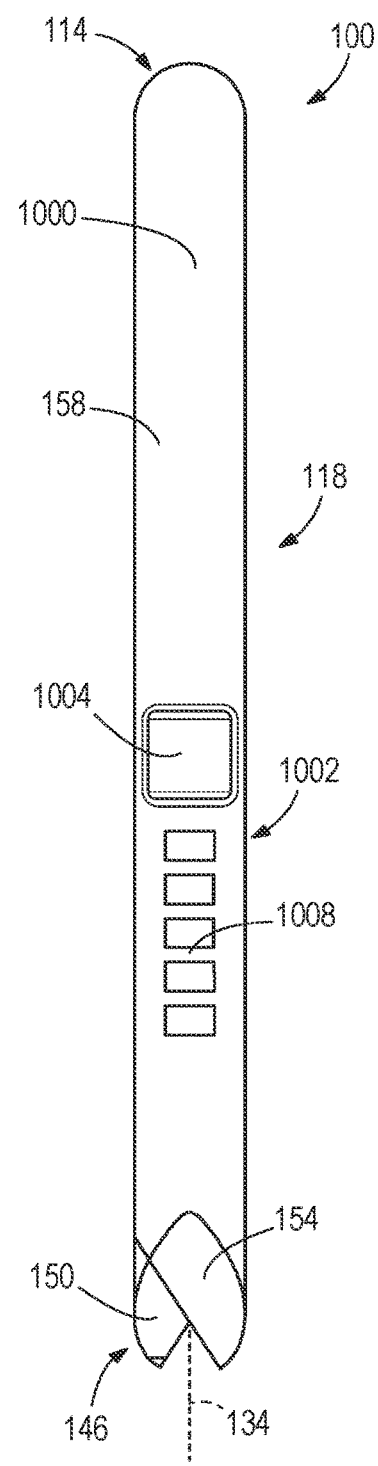
FIG. 4
FIG. 5

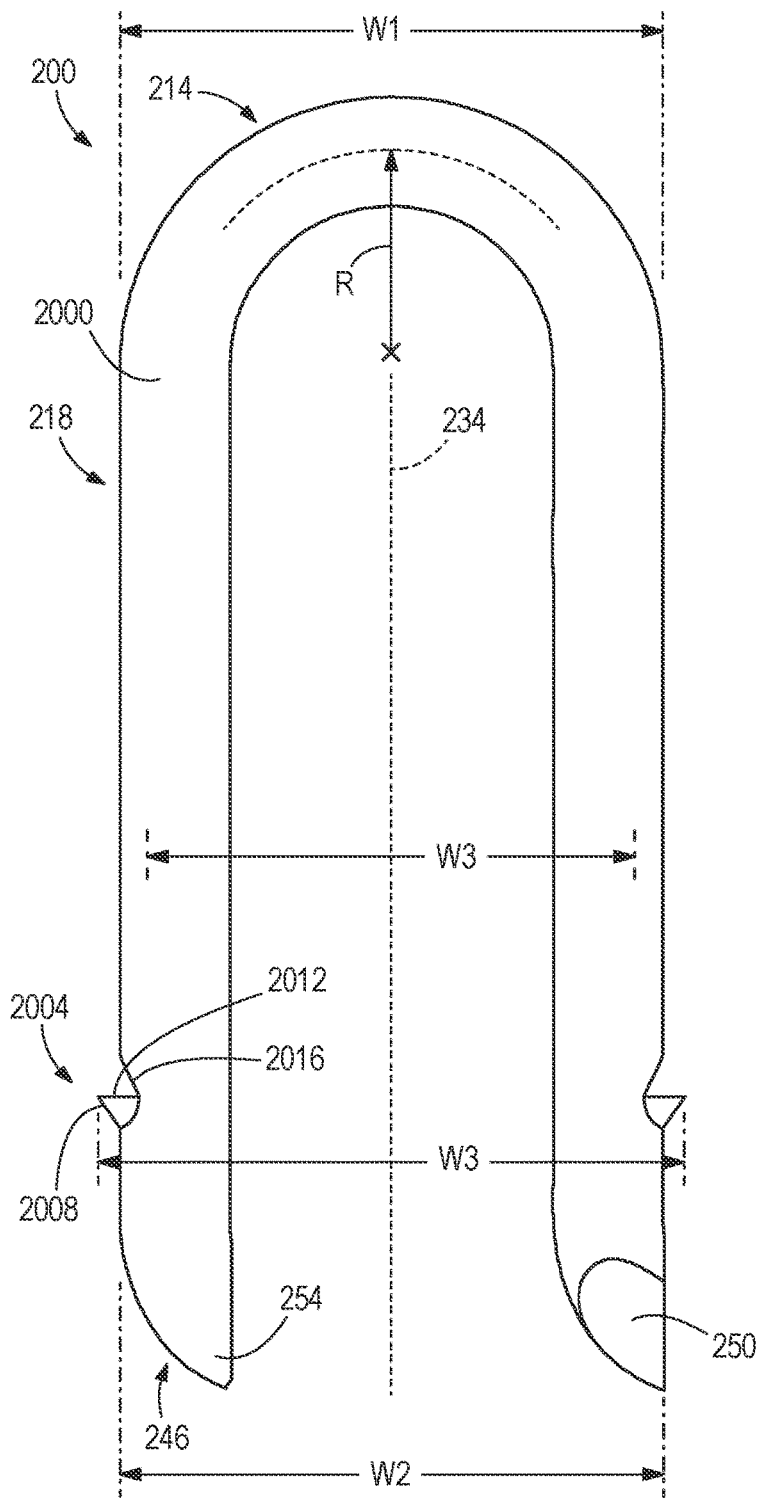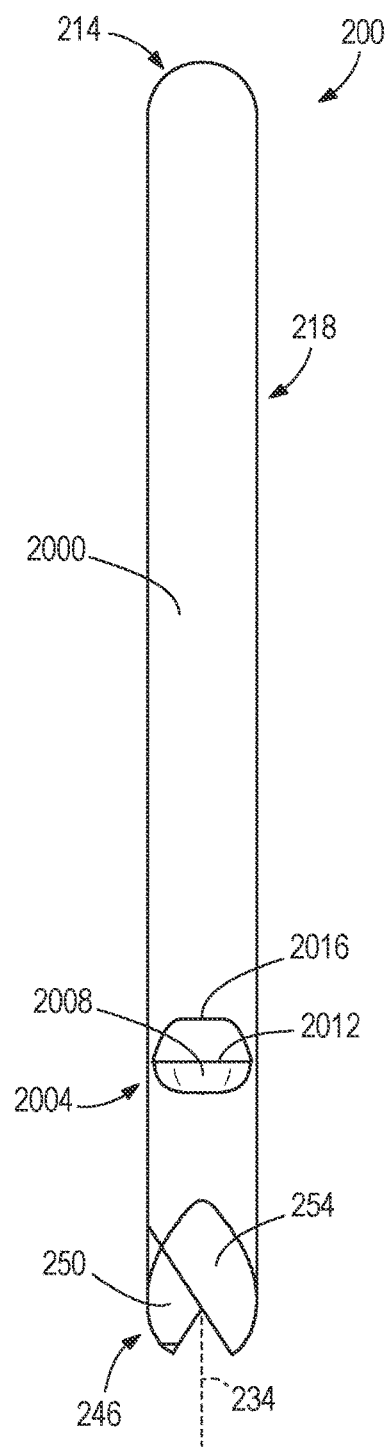
FIG. 6
FIG. 7

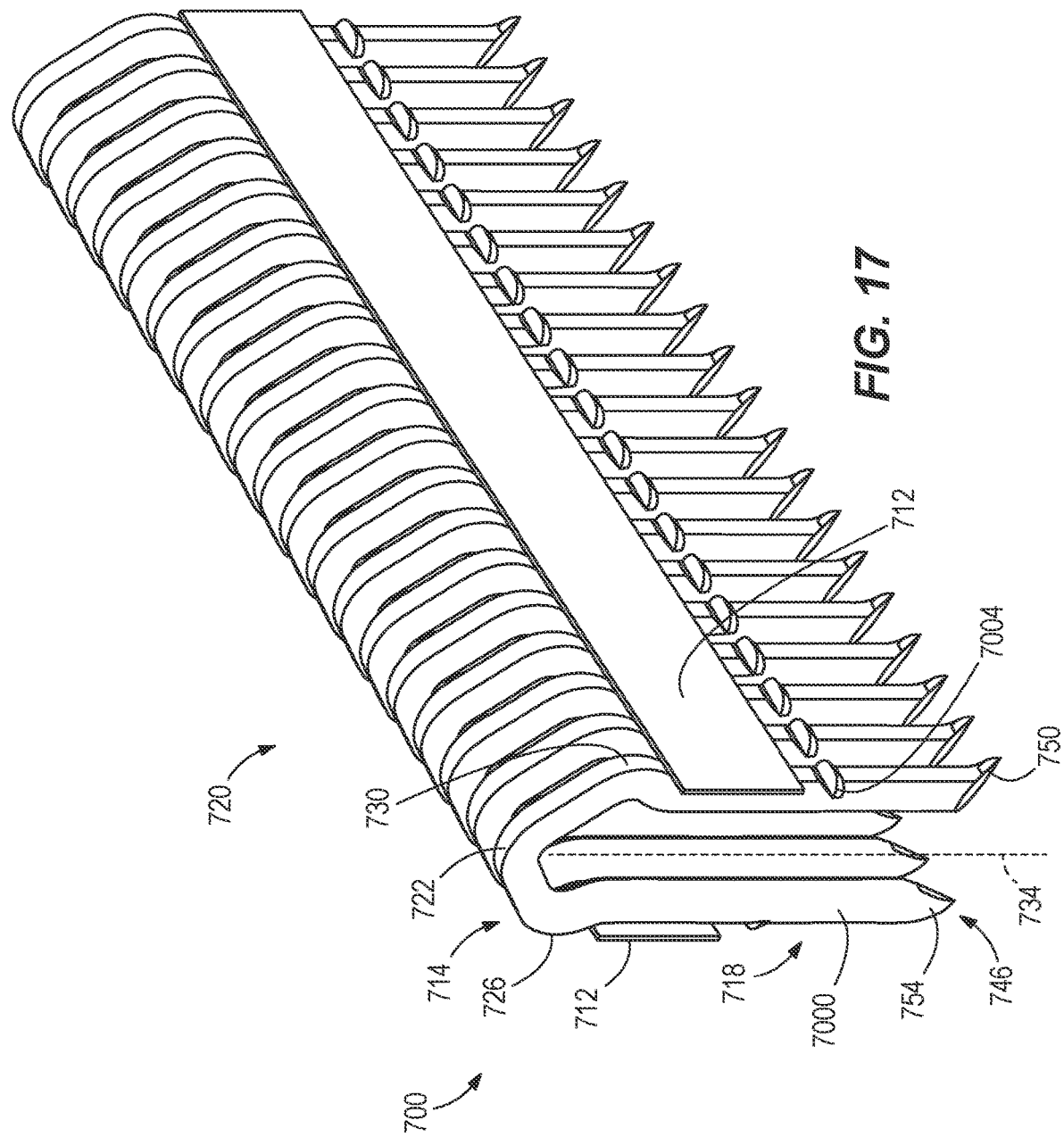

STAPLE AND STAPLE COLLATION

CROSS REFERENCE TO RELATED APPLICATIONS

This application claims priority to U.S. Provisional Patent Application No. 63/081,432 filed Sep. 22, 2020, the entire content of which is incorporated herein by reference.

FIELD OF THE INVENTION

The present invention relates to fasteners, and more particularly to staples and staple collations.

BACKGROUND OF THE INVENTION

Staples are typically used to attach items to a workpiece (e.g., a post, a fence, a power pole, etc.). Barbed staples, which include barbs extending from the legs thereof, can increase the "pullout" force required to remove the staples from the workpiece.

SUMMARY OF THE INVENTION

The invention provides, in one aspect, a staple collation including a first staple, an identical second staple adjacent the first staple, and an adhesive material coupling the first staple to the second staple. Each of the first staple and the second staple includes a crown section having opposite ends and a pair of leg sections extending from the opposite ends of the crown section. The second staple is offset from the first staple in a first, lateral direction, and wherein the second staple is offset from the first staple in a second, vertical direction that is perpendicular to the lateral direction.

In some aspects, when viewed in a plan view, a longitudinal axis of the staple collation extends at a first angle relative to a central plane of symmetry of the first staple and intersects a central plane of symmetry of the second staple, and when viewed in a side view, the longitudinal axis of the staple collation extends at a second angle relative to a driving axis of the staple collation. In some aspects, the first angle is within a range from 10 degrees to 45 degrees. In some aspects, the second angle is within a range from 65 degrees to 85 degrees. In some aspects, the first and second staple each has an outer width defined by the crown section and the central plane of symmetry of the first staple is laterally offset from the central plane of symmetry of the second staple in the first direction by a distance. In some aspects, the distance is 1 percent to 20 percent of the outer width of the first staple. In some aspects, a barb projects outward from each of the leg sections in a widthwise direction and the adhesive material is coupled to the leg sections between the crown section and the barb. In some aspects, an outer width defined between the barb on each of the leg sections is less than or equal to the outer width of the crown section. In some aspects, the first and second staple each has a length and the second staple is vertically offset from the first staple in the second direction by a distance. In some aspects, the distance is 1 percent to 10 percent of the length of the first staple. In some aspects, the crown sections of the first and second staples are diamond-shaped with a first curve, a second curve, and a third curve representing three points of a diamond. In some aspects, each of the first curve, the second curve, and the third curve is defined by an identical radius.

The invention provides, in another aspect, a powered fastener driver including a housing defining a handle portion and a cylinder housing portion, a driver blade extending longitudinally along the cylinder housing portion and defining a driving axis, a nosepiece, a magazine obliquely extending from the nosepiece in both a plane containing the driving axis and a plane that is perpendicular to the driving axis, a staple collation housed within the magazine. The staple collation including a first staple positioned within the nosepiece, the first staple being aligned with the driving axis, an identical second staple adjacent the first staple, and an adhesive material coupling the first staple to the second staple. Each of the first staple and the second staple includes a crown section having opposite ends, and a pair of leg sections extending from the opposite ends of the crown section. The second staple is offset from the first staple in a first, lateral direction, and wherein the second staple is offset from the first staple in a second, vertical direction that is perpendicular to the lateral direction.

In some aspects, when viewed in an end view, a longitudinal axis of the magazine intersects the driving axis and extends at a first angle relative to a vertical reference plane containing the driving axis and bisecting the cylinder housing portion, and when viewed in a side view, the longitudinal axis of the magazine extends at a second angle relative to the driving axis. In some aspects, the first angle is within a range from 10 degrees to 45 degrees. In some aspects, when viewed in a plan view, a longitudinal axis of the staple collation extends at a third angle relative to a central plane of symmetry of the first staple and intersects a central plane of symmetry of the second staple, and when viewed in a side view, the longitudinal axis of the staple collation extends at a fourth angle relative to the driving axis. In some aspects, the first and second staple each has an outer width defined by the crown section, and the central plane of symmetry of the first staple is laterally offset from the central plane of symmetry of the second staple in the first direction by a distance. In some aspects, the distance is 1 percent to 20 percent of the outer width of the first staple. In some aspects, a barb projects outward from each of the leg sections in a widthwise direction, and the adhesive material is coupled to the leg sections of the staple between the crown section and the barb.

The invention provides, in another aspect, a staple collation includes a first staple, an identical second staple adjacent the first staple, and an adhesive material coupling the first staple to the second staple. Each of the first staple and the second staple includes a crown section having diamond shaped with a first curve, a second curve, and a third curve representing three points of a diamond, the crown section having opposite ends, a pair of leg sections extending from the opposite ends of the crown section, and a barb projecting outward from each of the leg sections in a widthwise direction.

In some aspects, each of the first curve, the second curve, and the third curve is defined by an identical radius. In some aspects, the first curve is positioned at an apex of the crown section that is bisected by a central plane of symmetry. In some aspects, the first curve is connected to the second curve and the third curve via respective straight segments. In some aspects, each of the straight segments is oriented at an angle within a range from 40 degrees to 50 degrees relative to the central plane of symmetry. In some aspects, the leg sections include leg segments that extend from the crown section and are parallel with each other. In some aspects, the leg segments include an adhesive coating. In some aspects, the adhesive material is coupled to the leg sections of the staple between the crown section and the barb. In some aspects, the crown section has an outer width that is greater than an outer width of the leg sections. In some aspects, an outer width defined by the barbs is greater than the outer width of the leg sections and is less than or equal to the outer width of the crown section. In some aspects, a distal end of one of the leg sections has a forward-facing inclined face, and wherein the distal end of the other leg section has a rearward-facing inclined face.

BRIEF DESCRIPTION OF THE DRAWINGS

FIG. 2 is a front view of the staple collation of FIG. 1.

FIG. 3 is a side view of one staple from the staple collation of FIG. 1.

FIG. 4 is a front view of a staple in accordance with another embodiment of the invention.

FIG. 5 is a side view of the staple of FIG. 4.

FIG. 6 is a front view of a staple in accordance with yet another embodiment of the invention.

FIG. 7 is a side view of the staple of FIG. 6.

FIG. 17 is a perspective view of a staple collation in accordance with another embodiment of the invention for use with the powered stapler of FIG. 14.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
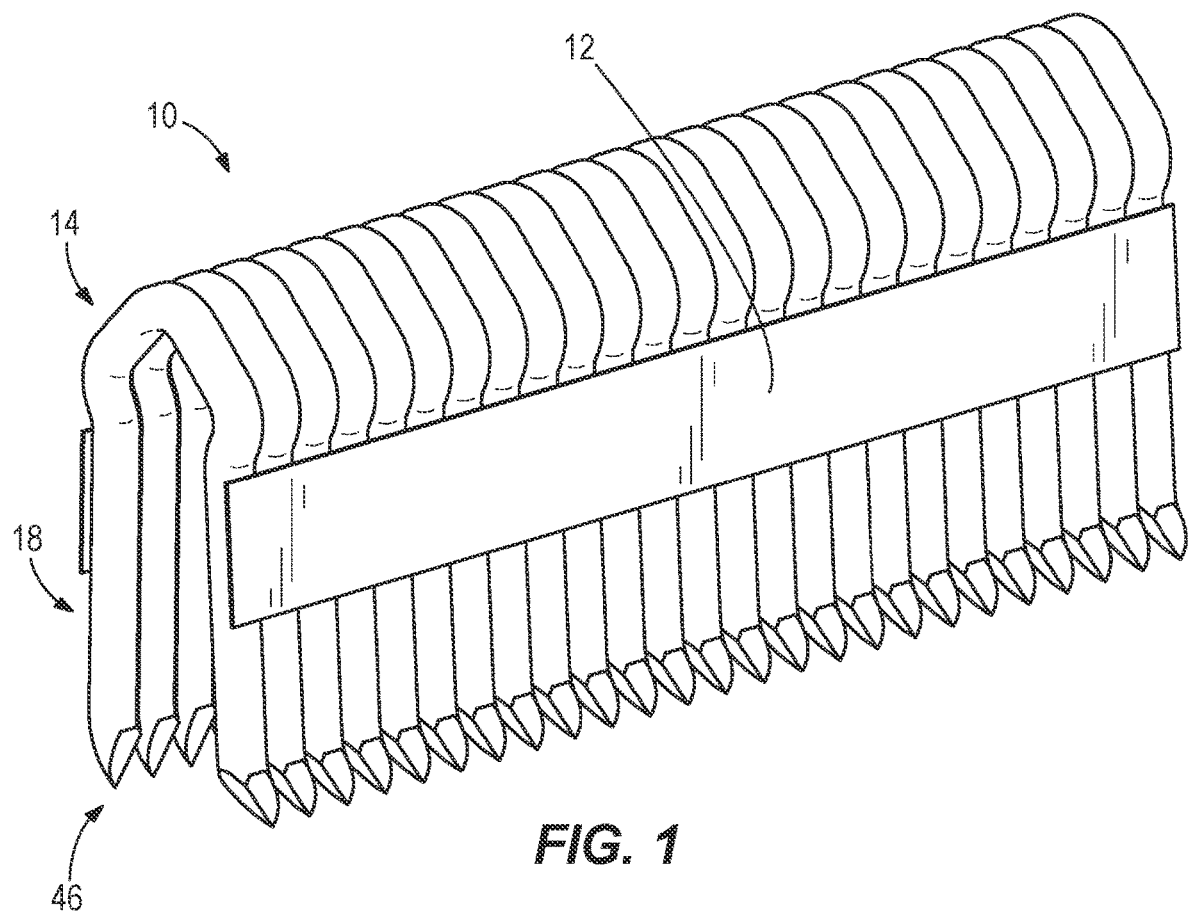
FIG. 1 is a perspective view of a staple collation in accordance with an embodiment of the invention.

FIGS. 1-3 illustrate a staple 10 that can be used with an electrically powered stapler to secure an item to a workpiece. The staple 10 includes a crown section 14 and leg sections 18 extending from opposite sides of the crown section 14. The staples 10 are connected with an adhesive material 12 (e.g., collation tape, glue, etc.) to form a staple collation 20. The adhesive material 12 may connect adjacent leg sections 18 of the staples 10. In the illustrated embodiment, the adhesive material 12 is collation tape.

With reference to FIG. 2, the crown section 14 is diamond-shaped with a first curve 22, a second curve 26, and a third curve 30 representing three points of a diamond. Each of the first curve 22, the second curve 26, and the third curve 30 is defined by an identical radius R. In the illustrated embodiment, the radius R is 2 millimeters. The first curve 22 is positioned at an apex of the crown section 14 that is bisected by a central plane 34 of symmetry, making the left and right sides of the staple 10 identical. The first curve 22 is connected to the second curve 26 and the third curve 30 via respective straight segments 38. In the illustrated embodiment, each of the straight segments 38 is oriented at an angle A1 of approximately 45 degrees relative to the central plane 34.

With continued reference to FIG. 2, each of the leg sections 18 includes an angled segment 42 that extends from the second curve 26 and the third curve 30, respectively. The angled segments 42 extend downwardly, away from the crown section 14, and outwardly, away from the central plane 34. In other words, the angled segments 42 extend away from each other. Each angled segment 42 is oriented relative to the central plane 34 by an angle A2 of 2 degrees. In alternative embodiments, the angled segment 42 may be oriented relative to the central plane 34 by an angle A2 between 0 and 10 degrees.

Each leg section 18 includes a distal end 46 adjacent the angled segment 42 and opposite the crown section 14. In the illustrated embodiment of the staple 10, the distal end 46 of one of the leg sections 18 has a forward-facing inclined face 50 and the distal end 46 of the other leg section 18 has a rearward-facing inclined face 54 (FIG. 3). During insertion of the staple 10 into a workpiece, the inclined faces 50, 54 guide the angled segments 42 in a curved or arcuate path, instead of a straight path, into the workpiece. Accordingly, the leg segments 18 are bent during the process of driving the staple 10 into the workpiece, increasing the pullout force required to remove the staple 10 from the workpiece. The inclined faces 50, 54 additionally define an oblique angle with respect to the central plane 34 to form a sharp edge at the distal ends 46 to facilitate driving the staple 10 into a workpiece. In some embodiments, the distal end 46 of the leg sections 18 may not include the inclined faces 50, 54 and may include straight cut tips. In such embodiments, the leg sections 18 may insert into the workpiece in a straight path.

With reference to FIG. 2, the crown section 14 has an outer width W1 that is approximately equal to an outer width W2 of the leg sections 18 measured between the distal ends 46. In the illustrated embodiment the outer width W1 of the crown section 14 and the outer width W2 of the leg sections 18 are each approximately 20 millimeters. In alternative embodiments, the outer width W1 of the crown section 14 may be less than or greater than the outer width W2 of the leg sections 18.

The staple 10 may be formed from any material including, but not limited to, a metal. In some embodiments, the staple 10 is formed from 1040 steel. The staple 10 may also have a coating including, but not limited to, zinc or an aluminum-zinc coating. Solely the leg sections 18 may include a withdrawal coating or adhesive to help maintain the staple 10 within the workpiece after being driven. The adhesive coating may further act as a lubricant when driving the staple 10 from a powered stapler, which promotes full engagement of the staple into the workpiece.

In use, the staple 10 is driven into a workpiece by an electrically powered fastener driver, such as a powered stapler. The sharp edges at the distal ends 46 pierce the workpiece, providing easier insertion of the staple 10 into the workpiece. Because the inclined faces 50, 54 extend in diverging directions, the leg sections 18 are driven into the workpiece in diverging directions. The inclination of the angled segments 42 further facilitates in diverging the leg sections 18 from a straight path when driven into the workpiece. As insertion of the staple 10 continues and depending upon the desired driving depth of the staple 10, the second and third curves 26, 30 of the crown section 14 may be driven into the workpiece, leaving only the first curve 22 of the crown section 14 externally visible from the workpiece. If only the first curve 22 is externally accessible, removal of the staple 10 is inhibited. Further, the inclination and/or bending of the leg sections 18 as described above also inhibits unwanted removal of the staple 10. To remove the staple 10, a tool is used to grasp onto the first curve 22 and exert an upward force on the staple 10 in a direction away from the workpiece.

FIGS. 4 and 5 illustrate a staple 100 according to another embodiment of the invention. The staple 100 is like the staple 10 shown and described in FIGS. 1-3. Therefore, like structures will be referred to by like reference numerals plus "100" and only the differences between the two will be discussed herein. The staple 100 includes a crown section 114 and leg sections 118 extending from opposite sides of the crown section 114. The crown section 114 defines a semi-circle having a uniform radius R. In the illustrated embodiment, the uniform radius R is 5.5 millimeters. The uniform radius R defines an apex of the of the crown section 114 that is bisected by a central plane 134 of symmetry, making the left and right sides of the staple 100 identical.

With reference to FIG. 4, each of the leg sections 118 includes leg segments 1000 that extend from the crown section 114. The leg sections 118 are parallel with each other, as well as parallel with the central plane 134. One or more of the leg sections 118 includes a plurality of recesses or indentations 1002 disposed on an outer face 158 of the leg section 118. In the illustrated embodiment, each leg section 118 includes the indentations 1002. In other embodiments, only a single leg section 118 may include the indentations 1002, while the other leg section 118 does not. In yet another embodiment, other the leg section 118 may include a barb (as described below). When the staple 100 is driven into a workpiece, the indentations 1002 enhance the grip to the workpiece to inhibit extraction of the staple 100.

The indentations 1002 project inwardly into the leg section 118 in a widthwise direction. The indentations 1002 include a large indent 1004 and a plurality of small indents 1008. The large indent 1004 is disposed at a mid-point of the leg section 118 between the crown section 114 and a distal end 146 of the leg section 118. The plurality of small indents 1008 are disposed below the large indent 1004, between the large indent 1004 and the distal end 146. In alternative embodiments, the large indent 1004 and the small indents 1008 may be disposed at an alternate location on the staple 100.

With continued reference to FIG. 4, the crown section 114 has an outer width W1 that is approximately equal to an outer width W2 of the leg sections 118 measured between the distal ends 146. In the illustrated embodiment, the outer width W1 of the crown section 114 and the outer width W2 of the leg sections are each 18.5 millimeters. In alternative embodiments, the outer width W2 of the crown section 114 may be less than or greater than the outer width W2 of the leg sections 118. An outer width W3 defined by the large indent 1004 is less than the outer width W1 of the crown section 114. An outer width W4 of the small indent 1008 is less than the outer width W1 of the crown section 114 and greater than the outer width W3 of the large indent 1004. In some embodiments, all of the indentations 1002 may have the same width (e.g., W3 or W4), which is less than the outer width W2 of the leg sections 118.

In use, the staple 100 is driven into a workpiece by an electrically powered fastener driver, such as a powered stapler. The sharp edges at the distal ends 146 of forward and rearward inclined faces 150, 154 pierce the workpiece, providing easier insertion of the staple 100 into the workpiece. Because the inclined faces 150, 154 extend in diverging directions, the leg sections 118 are driven into the workpiece in diverging directions. As insertion of the staple 100 continues and depending upon the desired driving depth of the staple, solely a portion of the crown section 114 may be driven into the workpiece, leaving the remaining portion of the crown section 114 externally visible from the workpiece. The plurality of recesses 1002 prevent removal of the staple 100 from the workpiece due to the plurality of recesses 1002 creating a friction force between the leg sections 118 and the workpiece. Further, the inclination and/or bending of the leg sections 118 as described above also inhibits unwanted removal of the staple 100. To remove the staple 100, a tool is used to grasp onto the portion of the crown section 114 that is externally visible from the workpiece and exert an upward force on the staple 100 in a direction away from the workpiece.

FIGS. 6 and 7 illustrate a staple 200 according to another embodiment of the invention. The staple 200 is like the staple 10 shown and described in FIGS. 1-3. Therefore, like structures will be referred to by like reference numerals plus "200" and only the differences between the two will be discussed herein. The staple 200 includes a crown section 214 and leg sections 218 extending from opposite sides of the crown section 214. The crown section 214 defines a semi-circle having a uniform radius R. In the illustrated embodiment, the uniform radius R is 5.5 millimeters. The uniform radius R defines an apex of the of the crown section 214 that is bisected by a central plane 234 of symmetry, making the left and right sides of the staple 200 identical.

With reference to FIG. 4, each of the leg sections 218 includes leg segments 2000 that extend from the crown section 214. The leg sections 218 are parallel with each other, as well as parallel with the central plane 234. Each leg segment 2000 includes a barb 2004 that projects outwardly from the leg section 218 in a widthwise direction. The barb 2004 is closer to a distal end 246 of the leg section than the crown section 214. In additional embodiments, the barb 2004 may be disposed closer to the crown section 214 than the distal end 246. In further embodiments, the barb 2004 may be disposed at a mid-point between the crown section 214 and the distal end 246. The barb 2004 includes projecting points 2008 that grip a portion of the workpiece to inhibit extraction of the staple 200. The projecting point 2008 defines a face 2012 that is perpendicular with the central plane 234. The face 2012 extends into a thickness of the leg section 218 in a widthwise direction, defining a recessed area 2016.

With continued reference to FIG. 4, the crown section 214 has an outer width W1 that is approximately equal to an outer width W2 of the leg sections 218 measured between the distal ends 246. In the illustrated embodiment, the outer width W1 of the crown section 214 and the outer width W2 of the leg sections 218 are each 18.5 millimeters. In alternative embodiments, the outer width of the crown section 214 may have an outer width that is less than or greater than an outer width of the leg sections 218. An outer width W3 defined by the barbs 2004 is greater than the outer width W1 of the crown section 214 and the outer width W2 of the leg sections 218. In the illustrated embodiment, the outer width W3 defined by the barbs 2004 is 20 millimeters.

In use, the staple 200 is driven into a workpiece by an electrically powered fastener driver, such as a powered stapler. The sharp edges at the distal ends 246 of forward and rearward inclined faces 250, 254 pierce the workpiece, providing easier insertion of the staple 200 into the workpiece. Because the inclined faces 250, 254 extend in diverging directions, the leg sections 218 are driven into the workpiece in diverging directions. As insertion of the staple 200 continues and depending upon the desired driving depth of the staple, solely a portion of the crown section 214 may be driven into the workpiece, leaving the remaining portion of the crown section 214 externally visible from the workpiece. The barbs 2004 prevent removal of the staple 200 from the workpiece due to the barbs 2004 latching onto the workpiece. Further, the inclination and/or bending of the leg sections 218 as described above also inhibits unwanted removal of the staple 200. To remove the staple 200, a tool is used to grasp onto the portion of the crown section 214 that is externally visible from the workpiece and exert an upward force on the staple 200 in a direction away from the workpiece.

Figure 8:
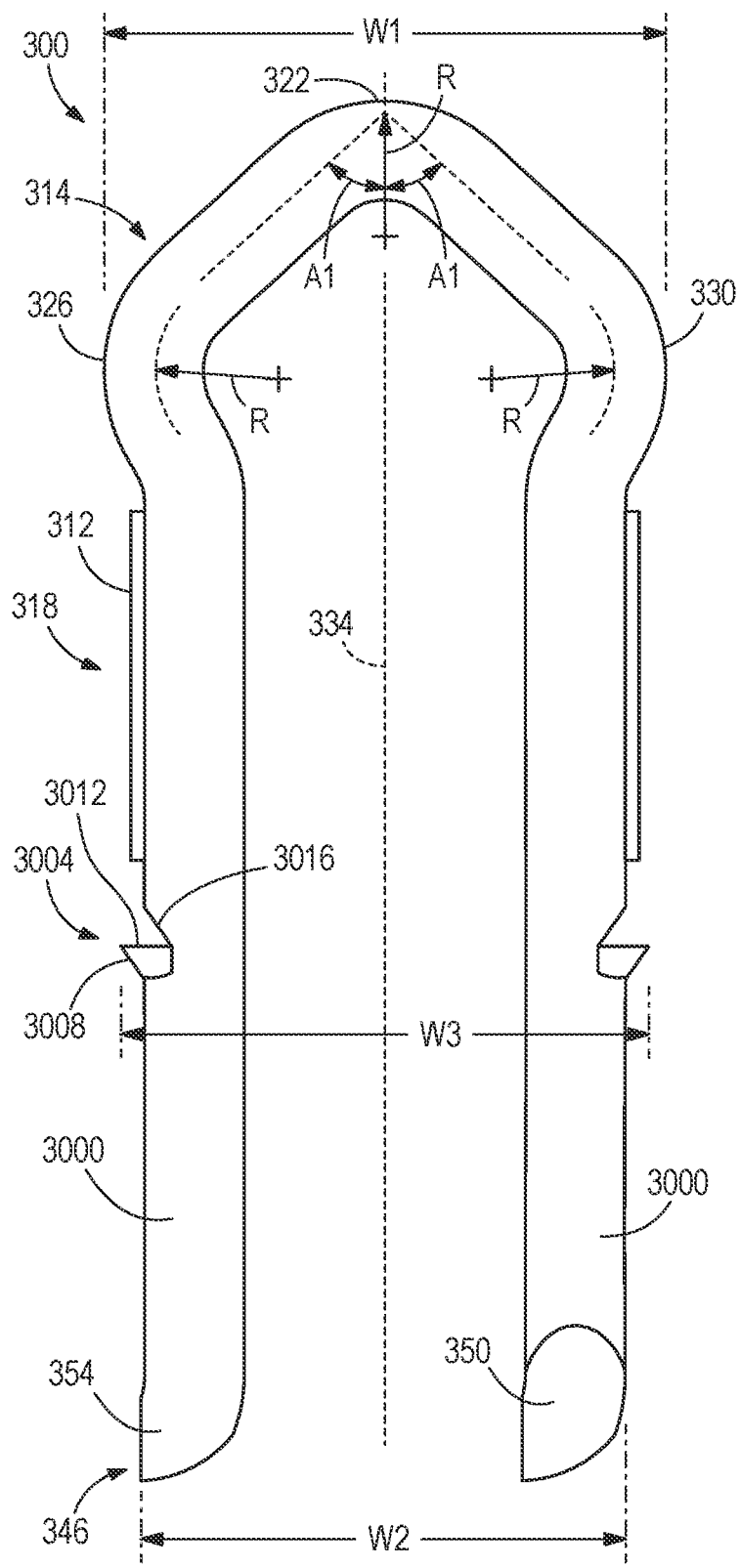
FIG. 8 is a front view of a staple collation in accordance with a further embodiment of the invention.
Figure 9:
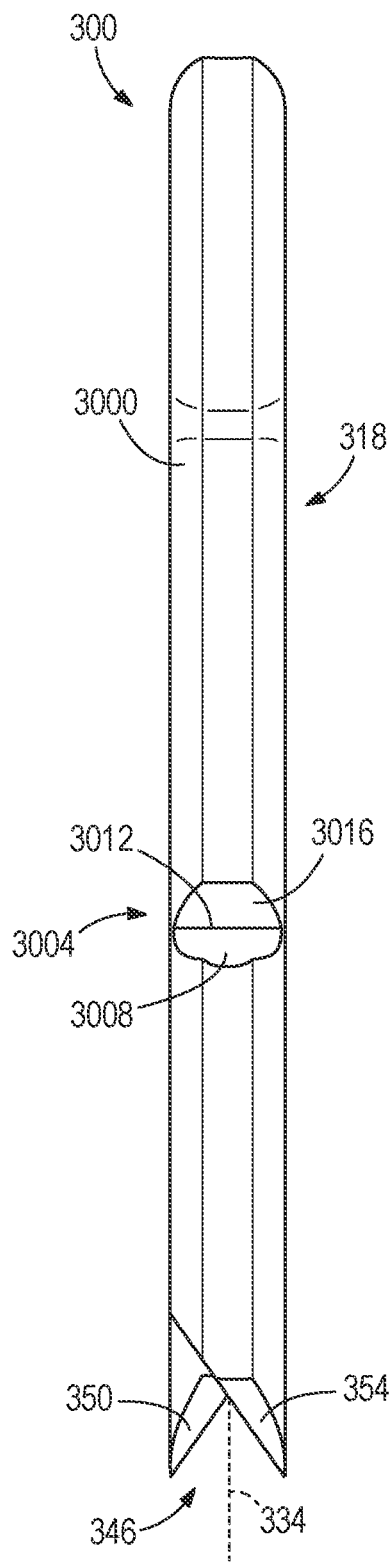
FIG. 9 is a side view of one staple from the staple collation of FIG. 8.

FIGS. 8 and 9 illustrate a staple 300 according to another embodiment of the invention. The staple 300 is like the staple 10 shown and described in FIGS. 1-3. Therefore, like structures will be referred to by like reference numerals plus "300" and only the differences between the two will be discussed herein. The staple 300 includes a crown section 314 and leg sections 318 extending from opposite sides of the crown section 314.

With reference to FIG. 8, the crown section 314 is diamond shaped with a first curve 322, a second curve 326, and a third curve 330 representing three points of a diamond. Each of the first curve 322, the second curve 326, and the third curve 330 is defined by an identical radius R. In the illustrated embodiment, the radius R is 2 millimeters. The first curve 322 is positioned at an apex of the crown section 314 that is bisected by a central plane 334 of symmetry, making the left and right sides of the staple 300 identical. The first curve 322 is connected to the second curve 326 and the third curve 330 via respective straight segments 338. In the illustrated embodiment, each of the straight segments 338 is oriented at an angle A1 of approximately 45 degrees relative to the central plane 334. In some embodiments the angle A1 is in a range from 40 degrees to 50 degrees.

The leg sections 318 include leg segments 3000 that extend from the crown section 314. The leg segments 3000 are parallel with each other, as well as parallel with the central plane 334. In some embodiments, the leg segments 3000 may include an adhesive coating. The adhesive coating may secure the leg segments 3000 within a workpiece. Each leg segment 3000 includes a barb 3004 that projects outwardly from the leg section 318 in a widthwise direction. The barb 3004 is closer to a distal end 346 of the leg section 318 than the crown section 314. The barb 3004 includes projecting points 3008 that grip a portion of the workpiece to inhibit extraction of the staple 300. The projecting point 3008 defines a face 3012 that is perpendicular with the central plane 334. The face 3012 extends into a thickness of the leg section 318 in a widthwise direction, defining a recessed area 3016. The staples 300 may be connected with an adhesive material 312 (e.g., collation tape, glue, etc.) to form a staple collation. The adhesive material 312 is coupled to the leg sections 318 of the staple 300 in an area between the crown section 314 and the barb 3004.

With reference to FIG. 8, the crown section 314 has an outer width W1 that is greater than an outer width W2 of the leg sections 318 measured between the distal ends 346. An outer width W3 defined by the barbs 3004 is greater than the outer width W2 of the leg sections 318 and is less than or equal to the outer width W1 of the crown section 314. As a result, the staple 300 may be used in an electrically powered fastener driver, such as a powered stapler, and does not require an additional channel or passageway within the magazine or nosepiece of the stapler to accommodate the barb 3004.

In use, the staple 300 is driven into a workpiece by an electrically powered fastener driver, such as a powered stapler. The sharp edges at the distal ends 346 pierce the workpiece, providing easier insertion of the staple 300 into the workpiece. Because the inclined faces 350, 354 extend in diverging directions, the leg sections 318 are driven into the workpiece in diverging directions. As insertion of the staple 300 continues and depending upon the desired driving depth of the staple 300, the second and third curves 326, 330 of the crown section 314 may be driven into the workpiece, leaving only the first curve 322 of the crown section 314 externally visible from the workpiece. If only the first curve 322 is externally accessible, removal of the staple 300 is inhibited. The barbs 3004 prevent removal of the staple 300 from the workpiece due to the barbs 3004 latching onto the workpiece. Further, the inclination and/or bending of the leg sections 318 as described above also inhibits unwanted removal of the staple 300. To remove the staple 300, a tool is used to grasp onto the first curve 322 and exert an upward force on the staple 300 in a direction away from the workpiece.

Figure 10:
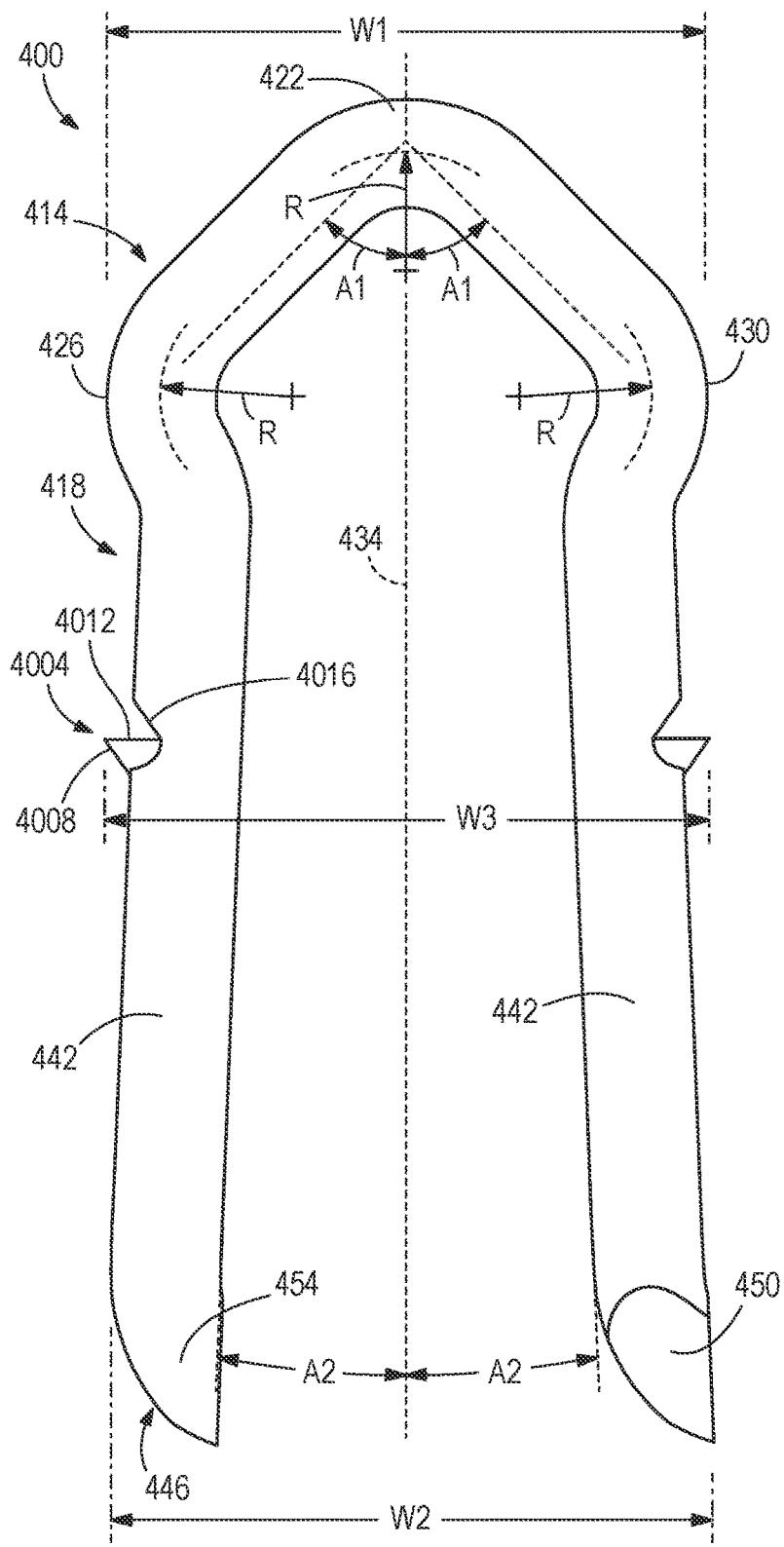
FIG. 10 is a front view of a staple in accordance with another embodiment of the invention.
Figure 11:
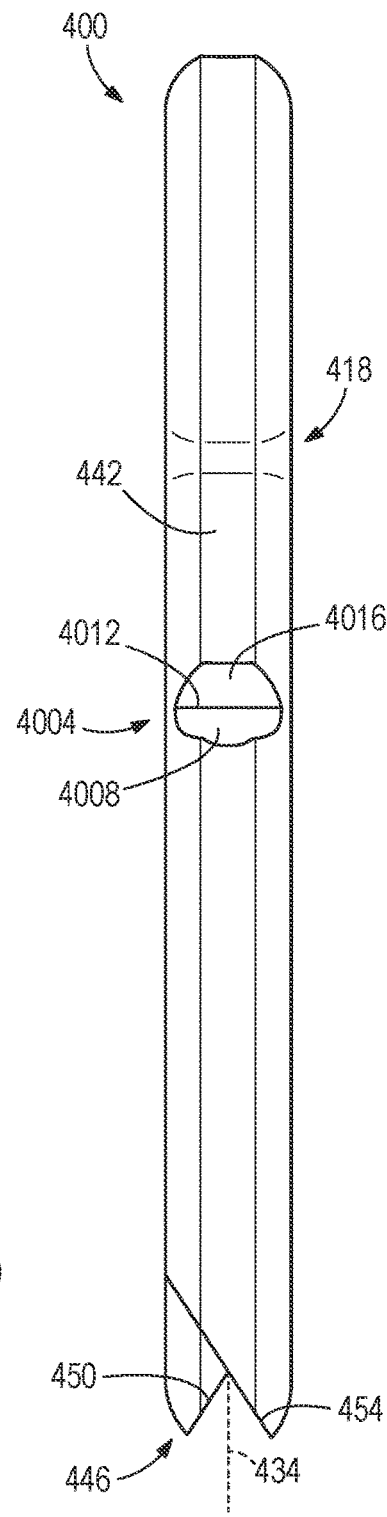
FIG. 11 is a side view of the staple of FIG. 10.

FIGS. 10 and 11 illustrate a staple 400 according to another embodiment of the invention. The staple 400 is like the staple 10 shown and described in FIGS. 1-3. Therefore, like structures will be referred to by like reference numerals plus "400" and only the differences between the two will be discussed herein. The staple 400 includes a crown section 414 and leg sections 418 extending from opposite sides of the crown section 414.

With reference to FIG. 10, the crown section 414 is diamond shaped with a first curve 422, a second curve 426, and a third curve 430 representing three points of a diamond. Each of the first curve 422, the second curve 426, and the third curve 430 is defined by an identical radius R. In the illustrated embodiment, the radius R is two millimeters. The first curve 422 is positioned at an apex of the crown section 414 that is bisected by a central plane 434 of symmetry, making the left and right sides of the staple 400 identical. The first curve 422 is connected to the second curve 426 and the third curve 430 via respective straight segments 438. In the illustrated embodiment, each of the straight segments 438 is oriented at an angle A1 of approximately 45 degrees relative to the central plane 434.

With continued reference to FIG. 10, each of the leg sections 418 includes an angled segment 442 that extends from the second curve 426 and the third curve 430, respectively. The angled segments 442 extend downwardly, away from the crown section 414, and outwardly, away from the central plane 434. In other words, the angled segments 442 extend away from each other. Each angled segment 442 is oriented relative to the central plane 434 by an angle A2 of 2 degrees. In alternative embodiments, the angled segment 442 may be oriented relative to the central plane 434 by an angle A2 between 0 and 10 degrees.

Each angled segment 442 includes a barb 4004 that projects outwardly from the leg section 418 in a widthwise direction. In the illustrated embodiment, the barb 4004 is closer to the crown section 414 than a distal end 446 of the leg section 418. In other embodiments, the barb 4004 may be alternatively positioned on the leg section 418 (e.g., at a mid-point of the leg section 418, closer to the distal end 446, etc.). The barb 4004 includes projecting points 4008 that grip a portion of the workpiece to inhibit extraction of the staple 400. The projecting point 4008 defines a face 4012 that is perpendicular with the central plane 434. The face 4012 extends into a thickness of the leg section 418 in a widthwise direction, defining a recessed area 4016.

With reference to FIG. 10, the crown section 414 has an outer width W1 that is approximately equal to outer width W2 of the leg sections 418 measured between the distal ends 446. In the illustrated embodiment the outer width W1 of the crown section 414 and the outer width W2 of the leg sections 418 are each approximately 20 millimeters An outer width W3 defined by the barbs 4004 is less than the outer width W2 of the leg sections 418 and the outer width W3 of the crown section 414. As a result, the staple 400 may be used in an electrically powered fastener driver, such as a powered stapler, and does not require an additional channel or passageway within the magazine or nosepiece of the stapler to accommodate the barb 4004.

In use, the staple 400 is driven into a workpiece by an electrically powered fastener driver, such as a powered stapler. The sharp edges at the distal ends 446 of the forward and rearward points 466, 470 pierce the workpiece, providing easier insertion of the staple 400 into the workpiece. Because the inclined faces 450, 454 extend in diverging directions, the leg sections 418 are driven into the workpiece in diverging directions. As insertion of the staple 400 continues and depending upon the desired driving depth of the staple 400, the second and third curves 426, 430 of the crown section 414 may be driven into the workpiece, leaving only the first curve 422 of the crown section 414 externally visible from the workpiece. If only the first curve 422 is externally accessible, removal of the staple 400 is inhibited. The barbs 4004 prevent removal of the staple 400 from the workpiece due to the barbs 4004 latching onto the workpiece. Further, the inclination and/or bending of the leg sections 418 as described above also inhibits unwanted removal of the staple 400. To remove the staple 400, a tool is used to grasp onto the first curve 422 and exert an upward force on the staple 400 in a direction away from the workpiece.

Figure 12:
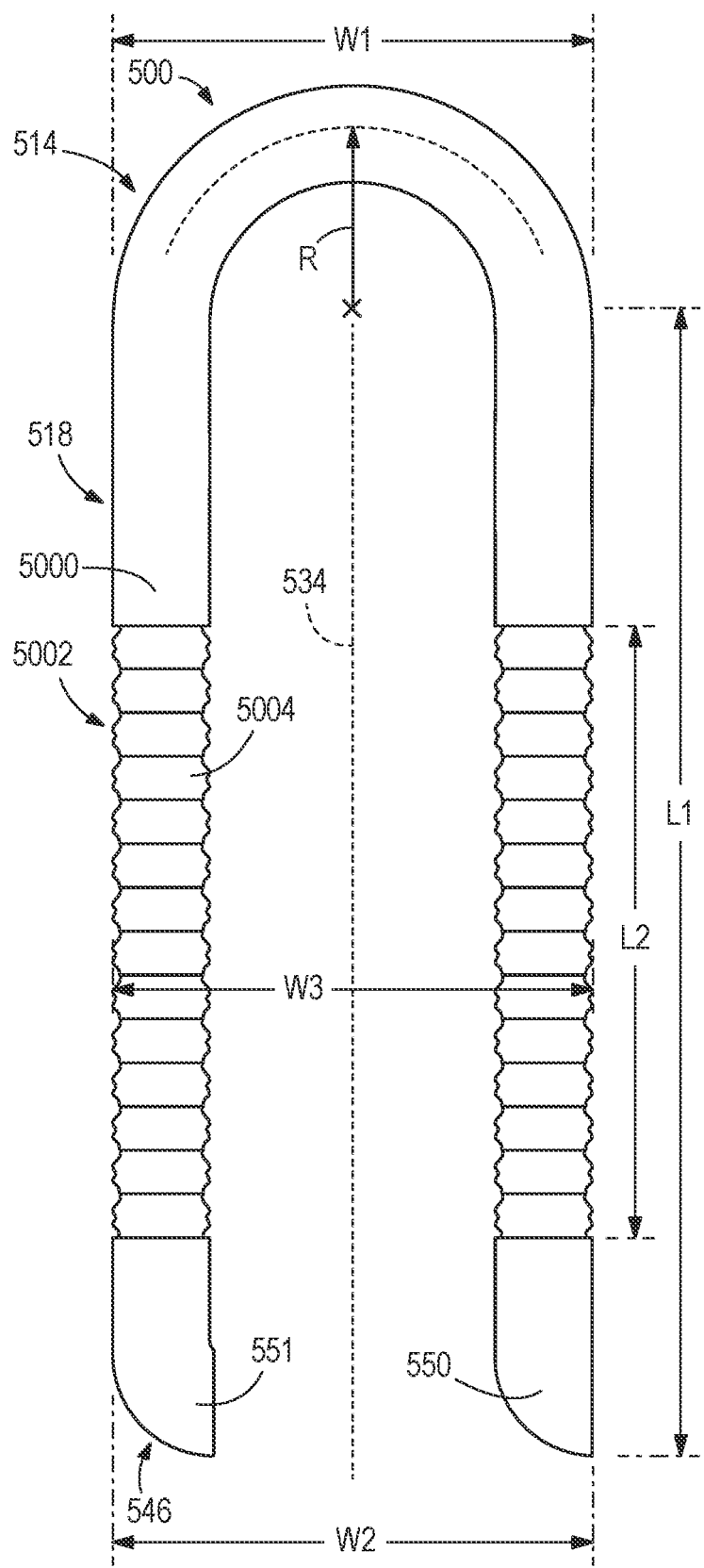
FIG. 12 is a front view of a staple in accordance with yet another embodiment of the invention.
Figure 13:
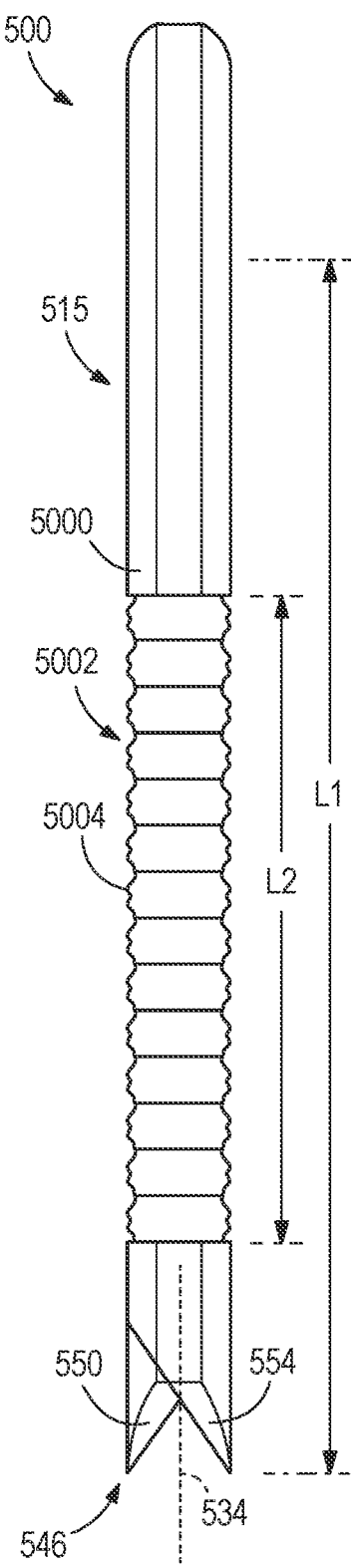
FIG. 13 is a side view of the staple of FIG. 12.

FIGS. 12 and 13 illustrate a staple 500 according to another embodiment of the invention. The staple 500 is like the staple 10 shown and described in FIGS. 1-3. Therefore, like structures will be referred to by like reference numerals plus "500" and only the differences between the two will be discussed herein. The staple 500 includes a crown section 514 and leg sections 518 extending from opposite sides of the crown section 514.

With reference to FIG. 12, the crown section 514 defines a semi-circle having a uniform radius R. In the illustrated embodiment, the uniform radius R is 5.5 millimeters. The uniform radius R defines an apex of the of the crown section 514 that is bisected by a central plane 534 of symmetry, making the left and right sides of the staple 500 identical. The leg sections 518 include leg segments 5000 that extend from the crown section 514. The leg sections 518 are parallel with each other, as well as parallel with the central plane 534.

One or more of the leg sections 518 includes an engagement or ring shank portion 5002 having a series of annular barbs 5004. In the illustrated embodiment, each leg section 518 includes the ring shank portion 5002. In other embodiments, only a single leg section 518 may include the ring shank portion 5002, while the other leg section 518 does not (e.g., has a uniform diameter). In yet another embodiment, the other leg section 118 may include a barb (e.g., like barb 2004) or indentations (e.g., like indentations 1002). The annular barbs 5004 grip portions of a workpiece to inhibit extraction of the staple 100. The annular barbs 5004 are disposed between the crown section 514 and a distal end 546 of the leg section 518. In the illustrated embodiment, the leg sections 518 have an overall length L1. The annular barbs 5004 extend a length L2, which is a portion of the overall length L2 of the leg section 518. In the illustrated embodiment, the length L2 along which the annular barbs 5004 extends is 50 percent of the overall length L1 of the leg section 518. In alternative embodiments, the length L2 may be between 25 percent to 80 percent of the overall length L1 of the leg section 518.

With continued reference to FIG. 12, the crown section 514 has an outer width W1 that is approximately equal to an outer width W2 of the leg sections 518 measured between the distal ends 246. An outer width W3 defined by the annular threads 5004 is approximately equal to the outer width W1 of the crown section 514 and the outer width W2 of the leg sections 518. In some embodiments, the outer width W3 may be less than or greater than the outer width W1 of the crown section 514. In some embodiments, the outer width W3 may be less than or greater than the outer width W2 of the outer width of the leg sections 518.

In use, the staple 500 is driven into a workpiece by an electrically powered fastener driver, such as a powered stapler. The sharp edges at the distal ends 546 of forward and rearward inclined faces 550, 554 pierce the workpiece, providing easier insertion of the staple 500 into the workpiece. Because the inclined faces 550, 554 extend in diverging directions, the leg sections 518 are driven into the workpiece in diverging directions. As insertion of the staple 500 continues and depending upon the desired driving depth of the staple, solely a portion of the crown section 514 may be driven into the workpiece, leaving the remaining portion of the crown section 514 externally visible from the workpiece. The annular threads 5004 of the engagement portion 5004 prevent removal of the staple 500 from the workpiece due to the annular threads 5004 latching onto the workpiece. Further, the inclination and/or bending of the leg sections 518 as described above also inhibits unwanted removal of the staple 500. To remove the staple 500, a tool is used to grasp onto the portion of the crown section 514 that is externally visible from the workpiece and exert an upward force on the staple 500 in a direction away from the workpiece. In some embodiments, the distal end 546 of the leg sections 518 may not include the inclined faces 550, 554 and may include straight cut tips. In such embodiments, the leg sections 518 may insert into the workpiece in a straight path.

Figure 14:
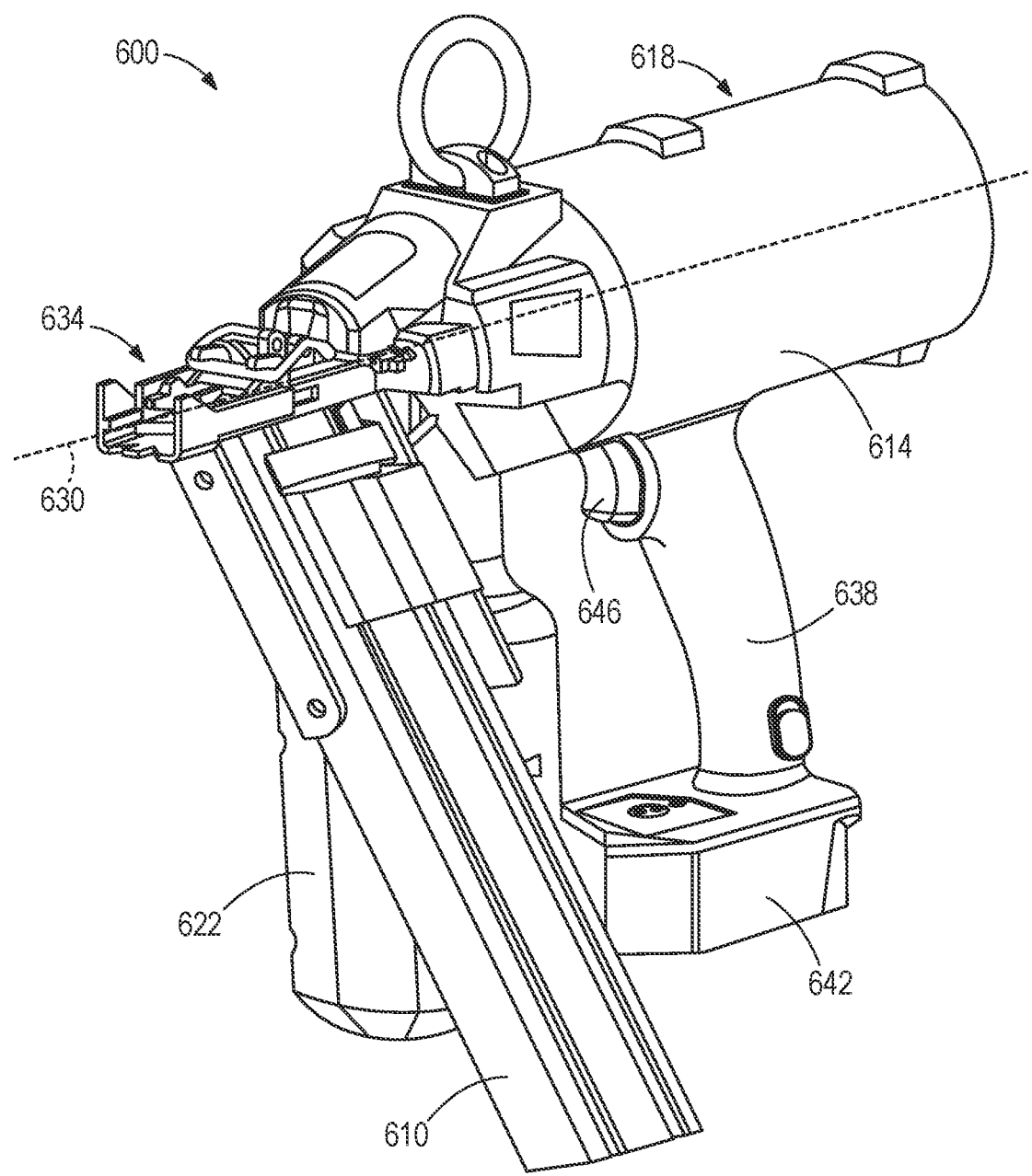
FIG. 14 is a perspective view of a powered stapler.
Figure 16:
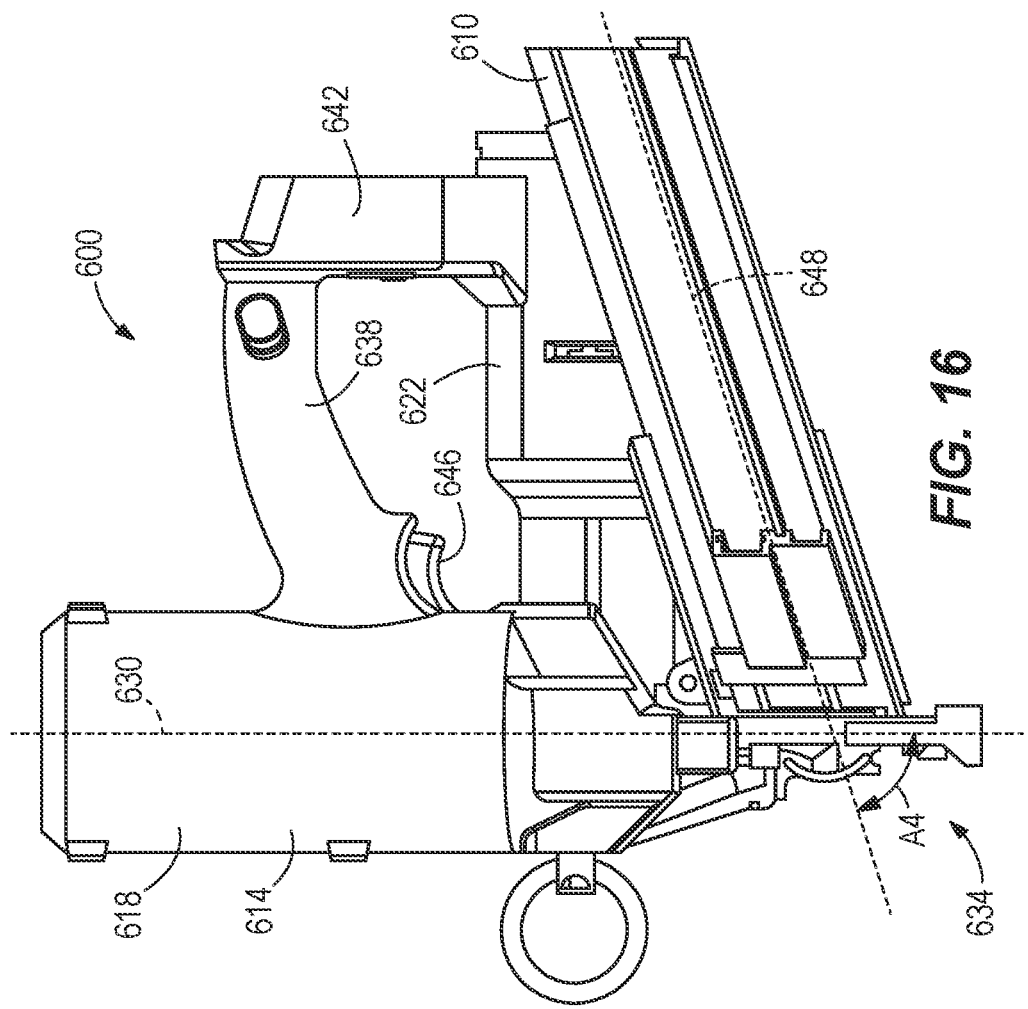
FIG. 16 is a side view of the powered stapler of FIG. 14.
Figure 15:
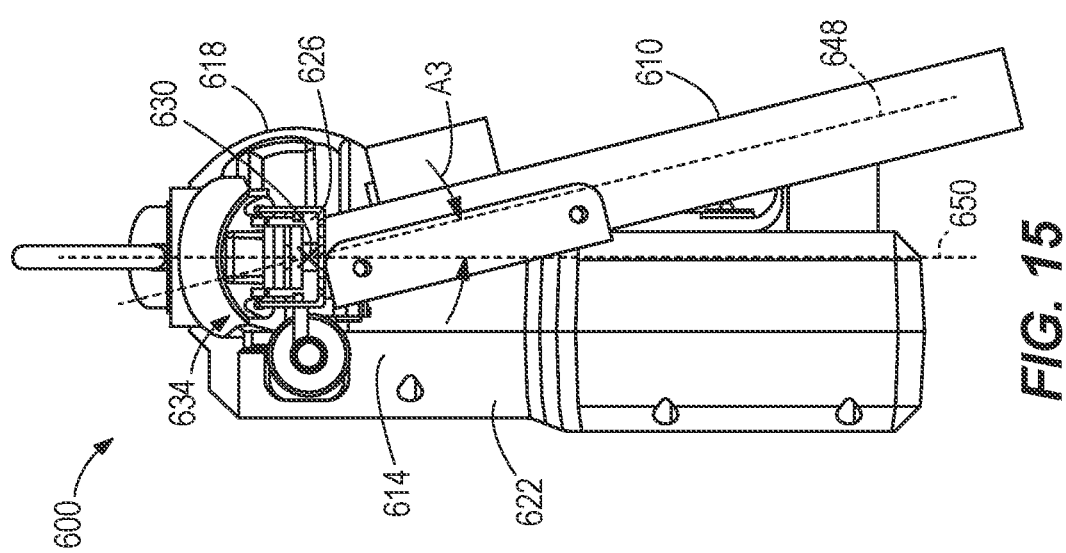
FIG. 15 is a bottom view of the powered stapler of FIG. 14.

FIGS. 14-16 illustrate a powered fastener driver, such as a powered stapler 600, that is operable to drive fasteners (e.g., the staples 10, 200, 300, 400, 500) held within a magazine 610 into a workpiece. The stapler 600 includes a housing 614 having a cylinder housing portion 618 and a motor housing portion 622 extending therefrom. The cylinder housing portion 618 houses a driver blade 626 (FIG. 15) that extends longitudinally along the cylinder housing portion 618 and defines a driving axis 630. The stapler 600 further includes a nosepiece 634 adjacent the front end of the magazine 610 to receive staples therefrom.

The housing 614 further includes a handle portion 638 extending from the cylinder housing portion 618, and a battery attachment portion 642 coupled to an opposite end of the handle portion 638. A battery pack (not shown) is electrically connectable to a motor (not shown) within the motor housing portion 622 for supplying electrical power to the motor. The handle portion 638 supports a trigger 646, which is depressed by a user to initiate a firing cycle of the stapler 600.

The magazine 610 obliquely extends from the nosepiece 634 in both a plane containing the driving axis 630 and a plane that is perpendicular to the driving axis 630 (FIG. 15). In other words, the magazine 610 appears angled or obliquely oriented from both a side view (FIG. 16) of the stapler 600 and an end view (FIG. 15) of the stapler 600. For example, in the end view of the stapler 600 shown in FIG. 15, a longitudinal axis 648 of the magazine 610 intersecting the driving axis 630 extends at an angle A3 relative to a vertical reference plane 650 containing the driving axis 630 and bisecting the cylinder housing portion 618 of the stapler 600. And, in the side view of the stapler 600 shown in FIG. 16, the longitudinal axis of the magazine 610 extends at an angle A4 relative to the driving axis 630. In the illustrated embodiment of the stapler 600, angle A3 is about 14 degrees and angle A4 is about 72 degrees. In other embodiments, the angle A3 may be in a range from 10 degrees to 45 degrees and the angle A4 may be in a range from 65 degrees to 90 degrees.

FIGS. 17-20 illustrate a staple collation 720 for use with the stapler 600 of FIG. 14. The collation 720 includes a plurality of staples 700, each having a crown section 714 and leg sections 718 extending from opposite sides of the crown section 714. An adhesive material 712 connects adjacent staples to form the collation 720. In the illustrated embodiment, the adhesive material 712 is collation tape 712. The collation tape 712 is coupled to each leg section 718. In other embodiments, other adhesive materials may be used.

Figure 18:
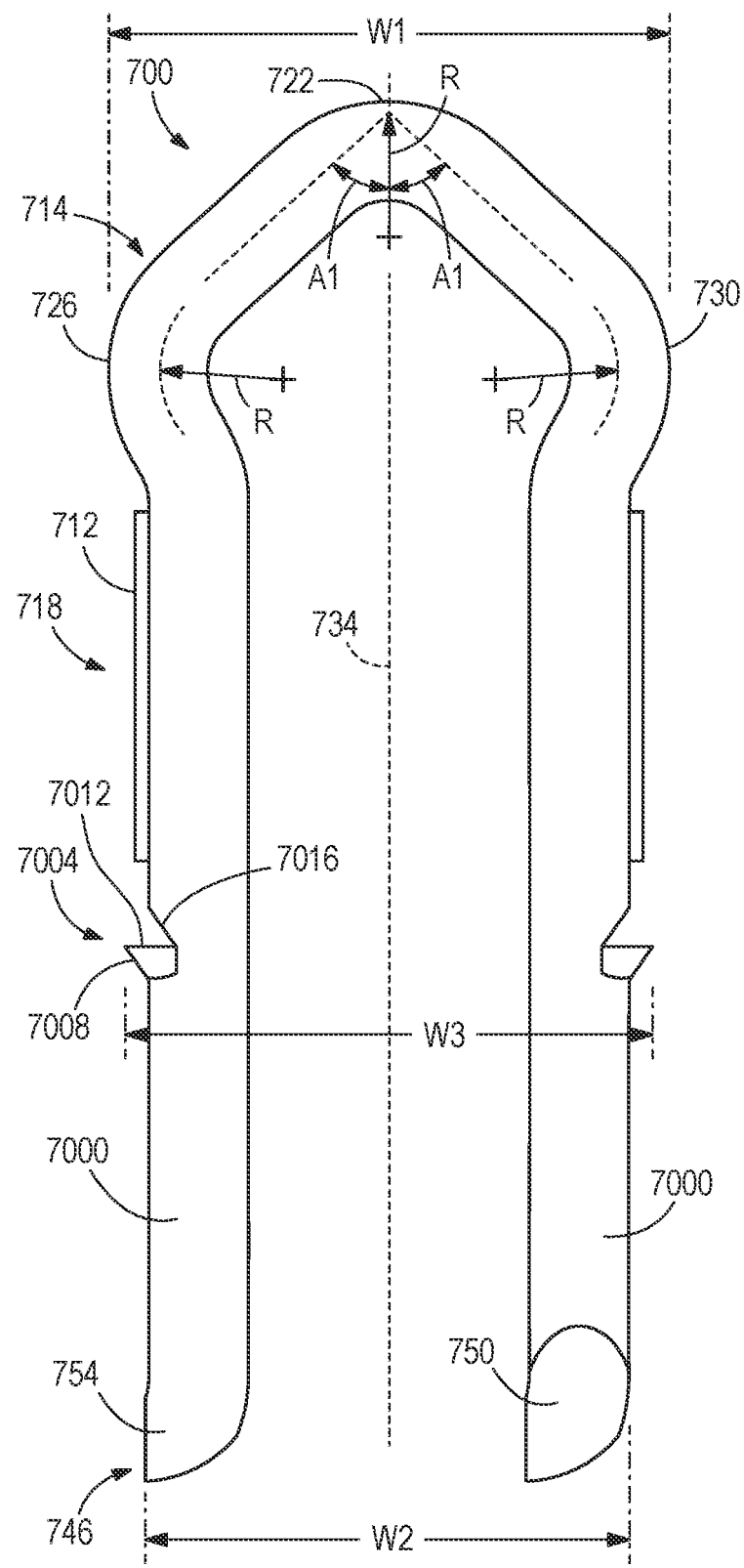
FIG. 18 is a front view of a single staple of the staple collation of FIG. 17.

FIG. 18 illustrates a single staple 700 of the staple collation 720. The crown section 714 of each staple 700 is diamond-shaped with a first curve 722, a second curve 726, and a third curve 730 representing three points of a diamond. Each of the first curve 722, the second curve 726, and the third curve 730 is defined by an identical radius R. In the illustrated embodiment, the radius R is 2 millimeters. The first curve 722 is positioned at an apex of the crown section 714 that is bisected by a central plane 734 of symmetry, making the left and right sides of the staple 700 identical. In some embodiments, the left and right sides of the staple 700 may not be identical. The first curve 722 is connected to the second curve 726 and the third curve 730 via respective straight segments 738. In the illustrated embodiment, each of the straight segments 738 is oriented at an angle A1 of approximately 45 degrees relative to the central plane 734.

The leg sections 718 of each staple 700 include leg segments 7000 that extend from the crown section 714. The leg segments 7000 are parallel with each other, as well as parallel with the central plane 734. One or more of the leg segments 7000 includes a barb 7004 that projects outward from the leg section 718 in a widthwise direction. In the illustrated embodiment, each leg segment 7000 includes the barb 7004, which is closer to a distal end 746 of the leg section 718 than the crown section 714. In other embodiments, the barb 7004 may be positioned at different locations on the leg segments 700. For example, in embodiments where the left and right sides of the staple 700 are not identical, the barb 7004 on one leg segment 7000 may be positioned closer to the crown section 714 and the barb on the other leg segment 7000 may be positioned closer to the distal end 746. The adhesive material 712 is coupled to the leg sections 718 of the staple 700 between the crown section 714 and the barb 7004.

With continued reference to FIG. 18, the crown section 714 has an outer width W1 that is greater than an outer width W2 of the leg sections 718 measured between the distal ends 746. An outer width W3 defined by the barbs 7004 is greater than the outer width W2 of the leg sections 718 and less than or equal to the outer width W1 of the crown section 714. In the illustrated embodiment, the outer width W1 of the crown section 714 is 20 millimeters, the outer width W3 defined by the barbs 7004 is 19.3 millimeters, and the outer width of the leg sections 718 is 17.5 millimeters. A length L of the staple 700 is defined as the distance between the apex of the crown section 714 and the distal end 746 of the staple 700. In the illustrated embodiment, the length L of the staple is 50.5 millimeters.

Figure 19:
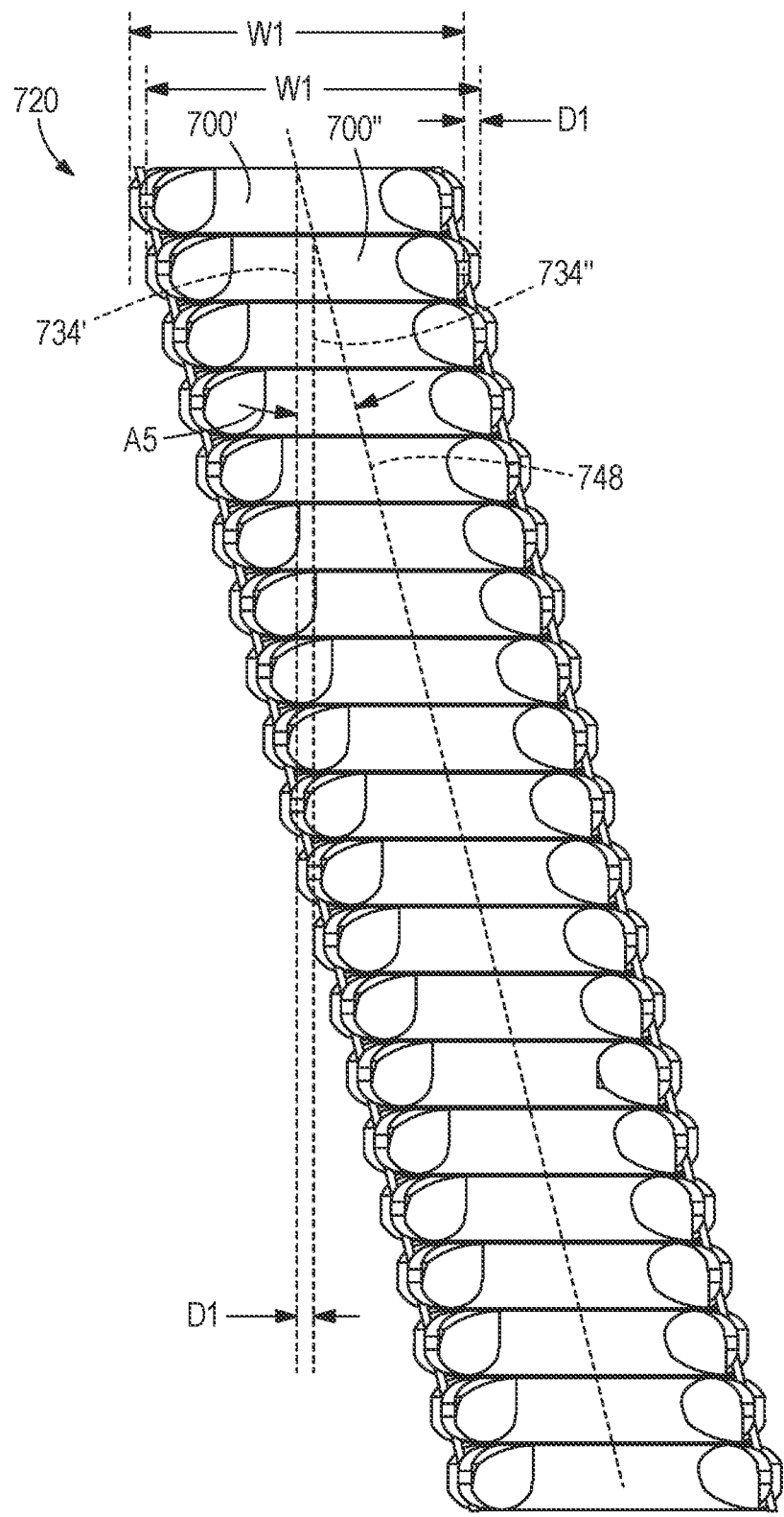
FIG. 19 is a bottom view of the staple collation of FIG. 17.
Figure 20:
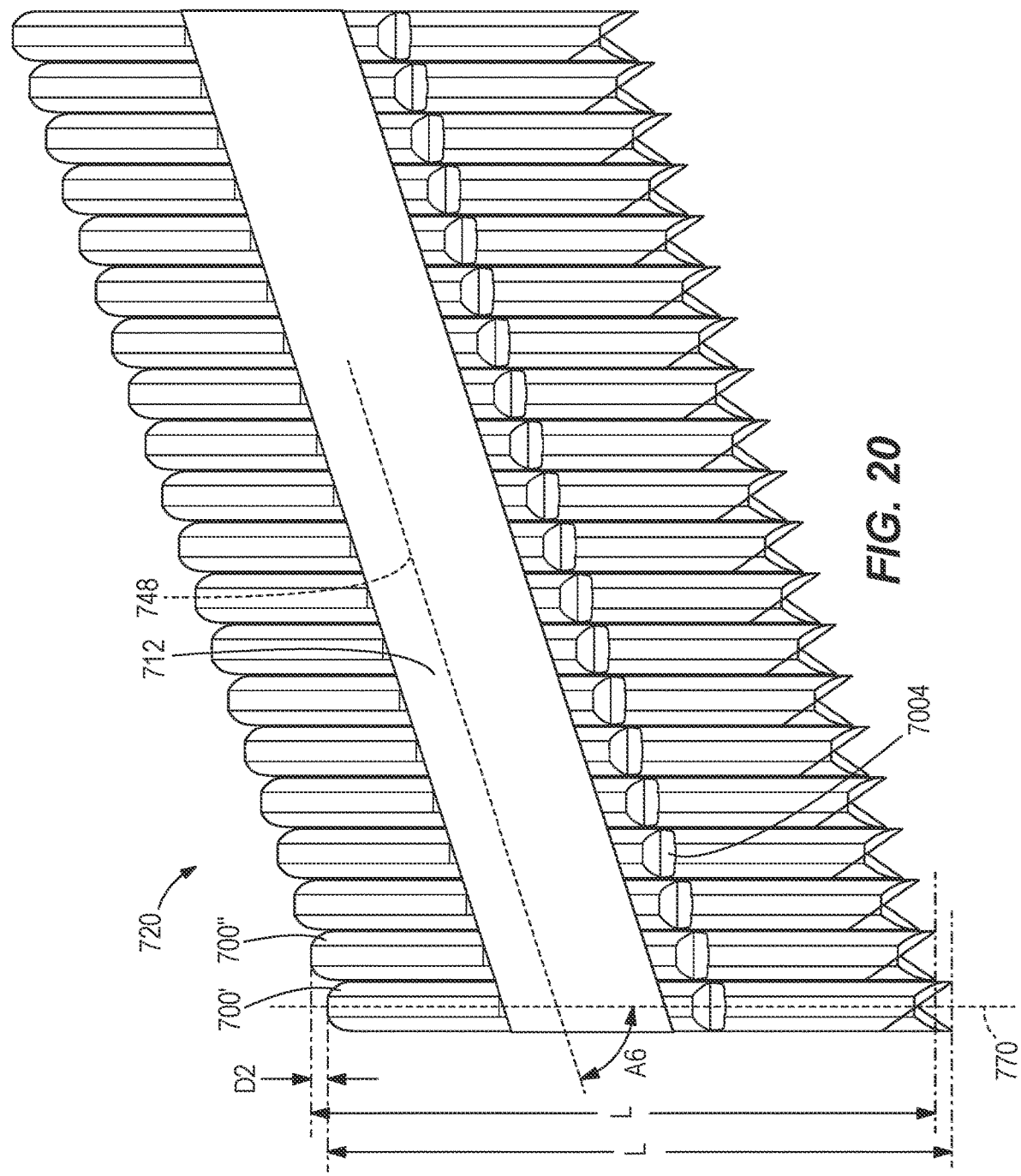
FIG. 20 is a side view of the staple collation of FIG. 17.
Figure 21:
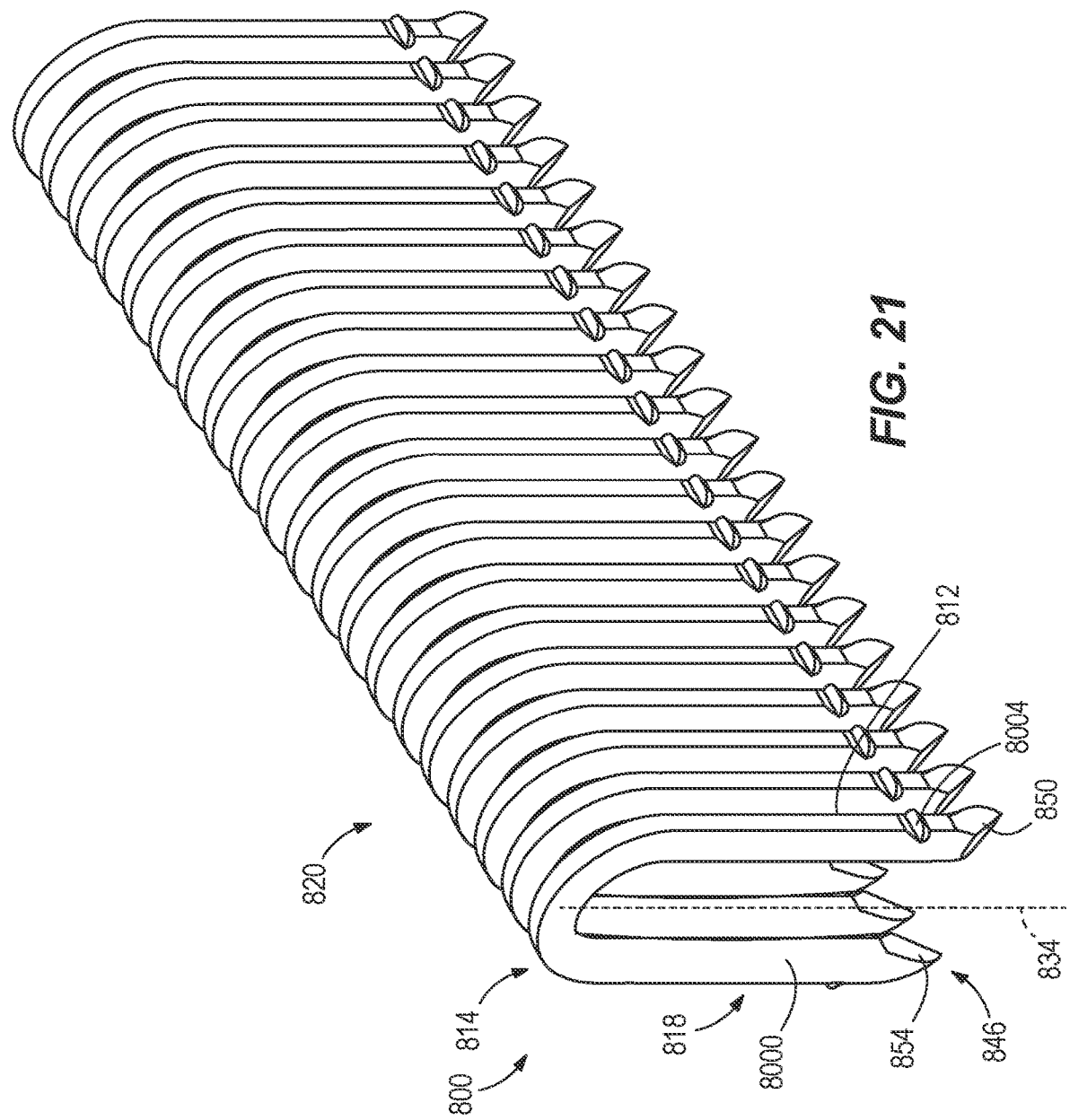
FIG. 21 is a perspective view of a staple collation in accordance with yet another embodiment of the invention for use with the powered stapler of FIG. 14.

With reference to FIGS. 19 and 20, the staple collation 720 is illustrated in similar orientations as the magazine 610 of the powered stapler 600 in FIGS. 15 and 16. The staple collation 720 includes a first, forwardmost staple 700' and an adjacent second staple 700". When the staple collation 720 is inserted within the magazine 610 of the stapler 600, the central plane 734' of the first staple 700' is aligned with and contains the driving axis 630. While the relative positioning of the first staple 700' and the second staple 700" are described in detail, it should be appreciated that the staple collation 720 may include any number of staples.

The second staple 700" is offset from the first staple 700' with reference to both the central plane 734' of the first staple 700' (FIG. 20) and a plane that is perpendicular to the central plane 734' (FIG. 19). In other words, the second staple 700" is vertically offset from the first staple 700' in the side view of the staple collation 720 shown in FIG. 20. And, the second staple 700" is laterally offset from the first staple 700' in the bottom view of the staple collation 720 shown in FIG. 19.

For example, as shown in the plan view of FIG. 19, a longitudinal axis 748 of the staple collation 720 extends at an angle A5 relative to the central plane 734' of the first staple 700' and intersects the central plane 734" of the second staple 700". In the illustrated embodiment, angle A5 is about 14 degrees. In other embodiments, the angle A5 may be in a range from 10 degrees to 45 degrees.

In the illustrated embodiment, the first and second staple 700', 700' each has an outer width W1 defined by the crown section 714 (FIG. 18) of 20 millimeters. The angle A5 laterally offsets the second staple 700" from the first staple 700' by a distance D1. In the illustrated embodiment, the distance D1 is approximately 1 millimeter. As such, each staple of the staple collation 720 is laterally offset from each other by approximately 5 percent of the overall width W1 of the staple 700. In alternative embodiments, each staple of the staple collation 720 may be laterally offset each other by 1 percent to 20 percent of the outer width W1 of the staple 700. In other words, the central plane 734" of the first staple 700' is laterally offset the central plane 734" of the second staple 700" by the distance D1.

In the side view of the staple collation 720, as shown in FIG. 20, the longitudinal axis 748 of the staple collation 720 extends at an angle A6 relative to a driving axis 770 of the staple collation 720. The driving axis 770 of the staple collation 720 extends centrally through the first staple 700' and contains the central plane 734'. When the staple collation 720 is inserted within the magazine 610 of the stapler 600, the driving axis 770 of the collation 720 aligns with the driving axis 630 of the stapler 600. In the illustrated embodiment, angle A6 is about 72 degrees. In other embodiments, the angle A6 may be in a range from 65 degrees to 85 degrees.

In the illustrated embodiment, the first and second staple 700', 700' each has a length L of 50.5 millimeters. The angle A6 vertically offsets the second staple 700" from the first staple 700' by a distance D2. In the illustrated embodiment, the distance D2 is approximately 1.4 millimeters. As such, each staple of the staple collation 720 is vertically offset each other by approximately 3 percent of the length L of the staple 700. In alternative embodiments, each staple of the staple collation 720 may be vertically offset each other by 1 percent to 10 percent of the length of the staple 700. In other words, the central plane 734" of the first staple 700' is vertically offset the central plane 734" of the second staple 700" by the distance D2.

In use, the collated staple assembly 720 is inserted into the magazine 610 of the powered stapler 600 so the longitudinal axis 748 of the staple collation 720 is coaxial with the longitudinal axis 648 of the magazine 610 of the stapler 600 and the driving axis 770 of the collation 720, which contains the central plane 734' of the first staple 700', aligns with and contains the driving axis 630 of the stapler 600. When the trigger 646 of the powered stapler 600 is depressed, the first staple 700' is driven through the nosepiece 634, along the driving axis 630, and inserted into a workpiece. Then, the second staple 700" is advanced within the magazine 610 so the central plane 734" of the second staple 700" aligns with and contains the driving axis 630.

FIGS. 21-24 illustrate a staple collation 820 according to another embodiment of the invention. The collation 820 is like the collation 720 shown and described in FIGS. 17-20. Therefore, like structures will be referred to by like reference numerals plus "100" and only the differences between the two will be discussed herein. The staple collation 820 includes a plurality of staples 800, each having a crown section 814 and leg sections 818 extending from opposite sides of the crown section 814. An adhesive material 812 connects adjacent staples to form the collation 820. In the illustrated embodiment, the adhesive material 712 is glue. In other embodiments, other adhesive materials may be used.

Figure 22:
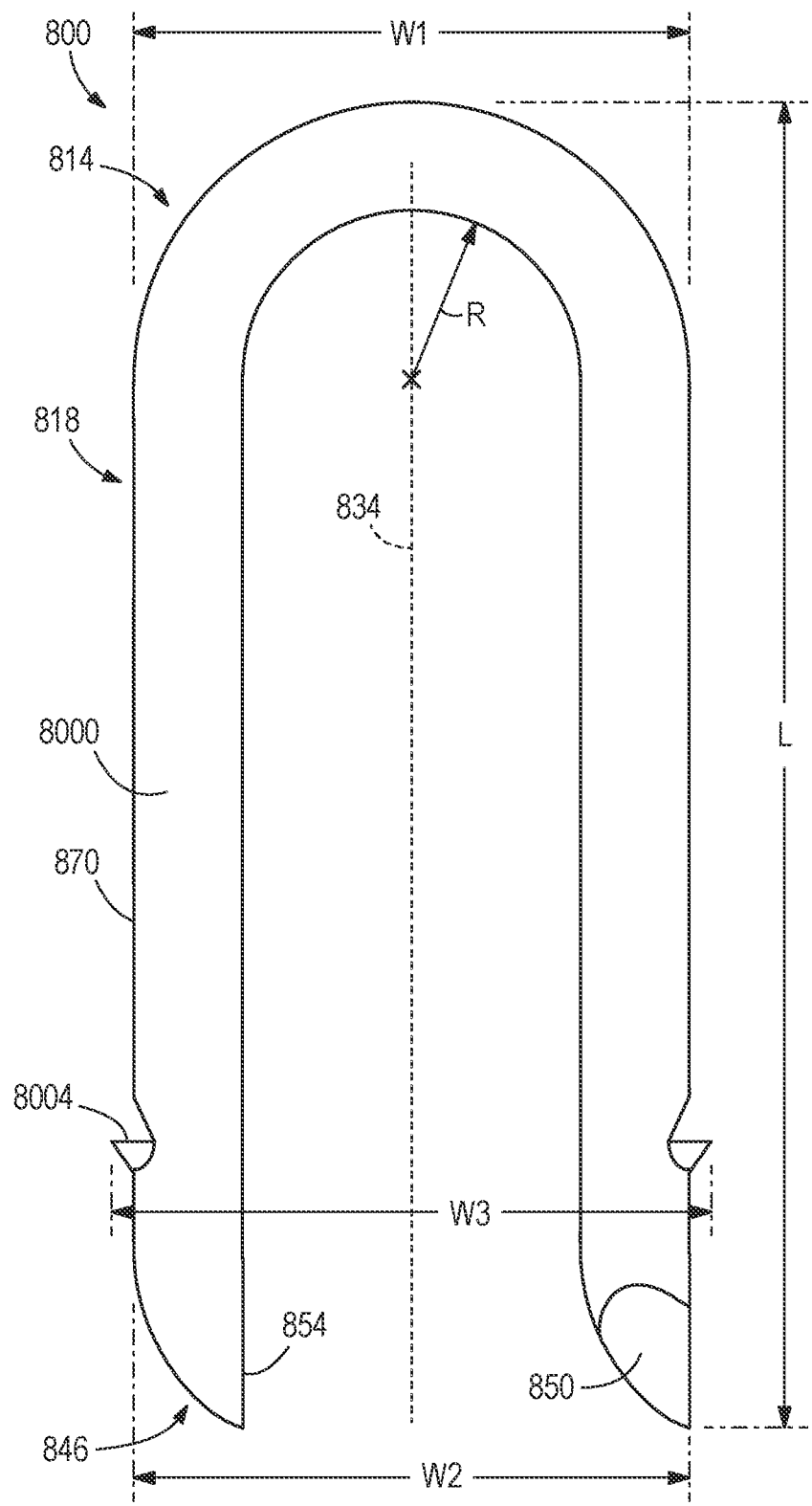
FIG. 22 is a front view of a single staple of the staple collation of FIG. 21.

With reference to FIG. 22, the crown section 814 defines a semi-circle having a uniform radius R. In the illustrated embodiment, the uniform radius R is 5.5 millimeters. The uniform radius R defines an apex of the of the crown section 814 that is bisected by a central plane 834 of symmetry, making the left and right sides of the staple 800 identical. The leg sections 818 include leg segments 8000 that extend from the crown section 814. The leg sections 818 are parallel with each other, as well as parallel with the central plane 834. Each leg segment 8000 includes a barb 8004 that projects outwardly from the leg section 818 in a widthwise direction. The barb 8004 is closer to a distal end 846 of the leg section than the crown section 814.

With continued reference to FIG. 22, the crown section 814 has an outer width W1 that is approximately equal to an outer width W2 of the leg sections 818 measured between the distal ends 846. In the illustrated embodiment, the outer width W1 of the crown section 814 and the outer width W2 of the leg sections 818 are each 18.5 millimeters. An outer width W3 defined by the barbs 8004 is greater than the outer width W1 of the crown section 814 and the outer width W2 of the leg sections 818. In the illustrated embodiment, the outer width W3 defined by the barbs 8004 is 20 millimeters. A length L of the staple 800 is defined as the distance between the apex of the crown section 814 and the distal end 846 of the staple 800. In the illustrated embodiment, the length L of the staple 800 is 46 millimeters.

Figure 23:
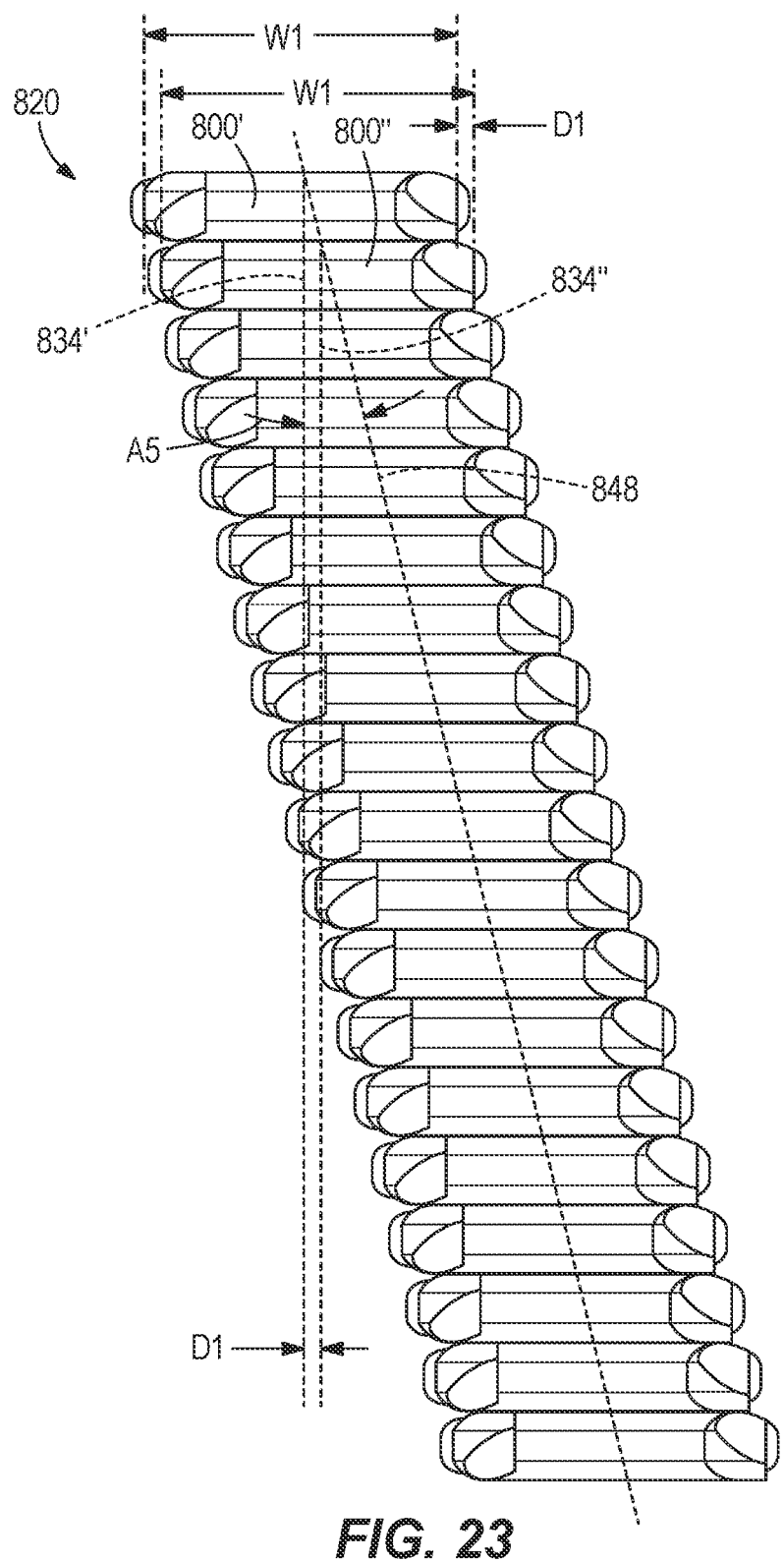
FIG. 23 is a bottom view of the staple collation of FIG. 21.
Figure 24:
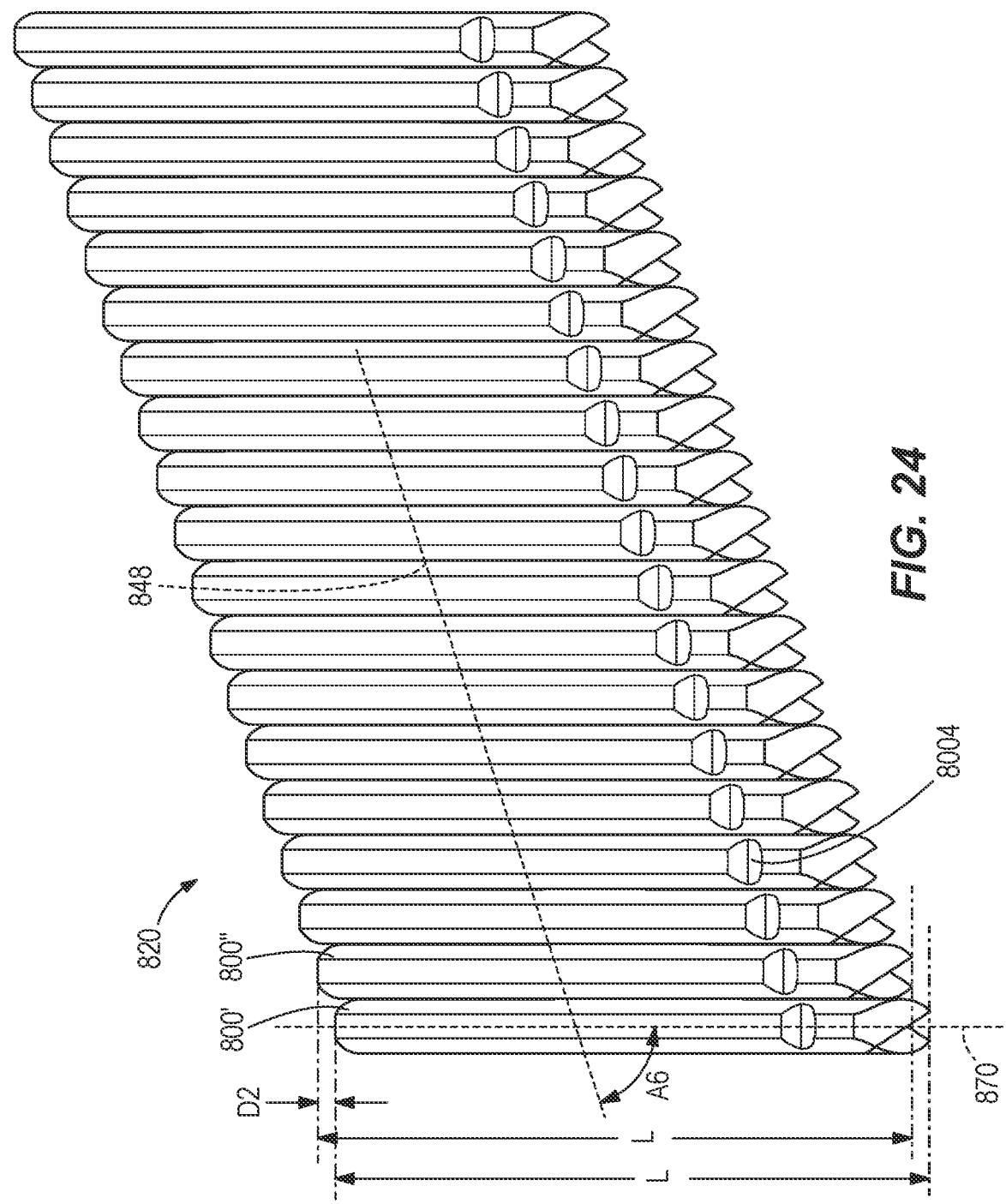
FIG. 24 is a side view of the staple collation of FIG. 21.

Now with reference to FIGS. 23 and 24, the staple collation 820 is illustrated in similar orientations as the magazine 610 of the powered stapler 600 in FIGS. 15 and 16. The staple collation 820 includes a first, forwardmost staple 800' and an adjacent second staple 800". When the staple collation 820 is inserted within the magazine 610 of the stapler 600, the central plane 834' of the first staple 800' is aligned with the driving axis 630. While the relative positioning of the first staple 800' and the second staple 800" are described in detail, it should be appreciated that the staple collation 820 may include any number of staples.

The second staple 800" is offset from the first staple 800' with reference to both the central plane 834' of the first staple 800' (FIG. 24) and a plane that is perpendicular to the central plane 834' (FIG. 23). In other words, the second staple 800" is vertically offset from the first staple 800' in the side view of the staple collation 820 shown in FIG. 24. And, the second staple 800" is laterally offset from the first staple 800' in the bottom view of the staple collation 820 shown in FIG. 23.

For example, in the plane view of FIG. 23, a longitudinal axis 848 of the staple collation 820 extends at an angle A5 relative to the central plane 834' of the first staple 800' and intersects the central plane 834" of the second staple 800". In the illustrated embodiment, angle A5 is about 14 degrees. In other embodiments, the angle A5 may be in a range from 10 degrees to 20 degrees.

In the illustrated embodiment, the first and second staple 800', 800' each has an outer width W1 defined by the crown section 814 (FIG. 22) of 18.5 millimeters. The angle A5 laterally offsets the second staple 800" from the first staple 800' by a distance D1. In the illustrated embodiment, the distance D1 is approximately 1 millimeter. As such, each staple of the staple collation 820 is laterally offset each other by approximately 5 percent of the overall width W1 of the staple 800. In alternative embodiments, each staple of the staple collation 820 may be laterally offset each other by 1 percent to 10 percent of the overall width W1 of the staple 800. In other words, the central plane 834" of the first staple 800' is laterally offset the central plane 834" of the second staple 800" by the distance D1.

In the side view of the staple collation 820, as shown in FIG. 24, the longitudinal axis of the staple collation 820 extends at an angle A6 relative to a driving axis 870 of the staple collation 820. The driving axis 870 of the staple collation 820 extends centrally through the first staple 800' and contains the central plane 834'. When the staple collation 820 is inserted within the magazine 610 of the stapler 600, the driving axis 870 of the collation 820 aligns with the driving axis 630 of the stapler 600. In the illustrated embodiment, angle A6 is about 72 degrees. In other embodiments, the angle A6 may be in a range from 65 degrees to 85 degrees.

In the illustrated embodiment, the first and second staple 800', 800' each has a length L of 46 millimeters. The angle A6 vertically offsets the second staple 800" from the first staple 800' by a distance D2. In the illustrated embodiment, the distance D2 is approximately 1.4 millimeters. As such, each staple of the staple collation 820 is vertically offset each other by approximately 3 percent of the length L of the staple 800. In alternative embodiments, each staple of the staple collation 820 may be vertically offset each other by 1 percent to 10 percent of the length of the staple 800. In other words, the central plane 834" of the first staple 800' is vertically offset the central plane 834" of the second staple 800" by the distance D2.

In use, the staple collated 820 is inserted into the magazine 610 of the powered stapler 600 so the longitudinal axis 846 of the staple collation 820 is coaxial with the longitudinal axis 648 of the magazine 610 of the stapler 600 and the driving axis 870 of the collation 820, which contains the central plane 834' of the first staple 800', aligns with the driving axis 630 of the stapler 600. When the trigger 646 of the powered stapler 600 is depressed, the first staple 800' is driven through the nosepiece 634, along the drive axis 870, and is inserted into a workpiece. The magazine 610 moves the second staple 800" so the central plane 834" of the second staple 800" aligns with the driving axis 630.

While the staple collations 720, 820 are described with reference to the staples 700, 800, it should be appreciated that any staple that includes a crown section and a pair of leg sections extending from the crown section may be collated in the same fashion as the staples 700, 800. For example, any of the staples 10, 100, 200, 300, 400, 500 may be collated together in a similar fashion as the staple collations 720, 820.

Although the invention has been described in detail with reference to certain preferred embodiments, variations and modifications exist within the scope and spirit of one or more independent aspects of the invention as described.

Various features of the invention are set forth in the following claims.

What is claimed is:

1. A staple collation comprising:
    a first staple;
    an identical second staple adjacent the first staple; and
    an adhesive material coupling the first staple to the second staple,
    wherein each of the first staple and the second staple includes
        a crown section having opposite ends, and
        a pair of leg sections extending from the opposite ends of the crown section,
    wherein the second staple is offset from the first staple in a first, lateral direction, and wherein the second staple is offset from the first staple in a second, vertical direction that is perpendicular to the lateral direction.

2. The staple collation of claim 1, wherein:
    when viewed in a plan view, a longitudinal axis of the staple collation extends at a first angle relative to a central plane of symmetry of the first staple and intersects a central plane of symmetry of the second staple, and
    when viewed in a side view, the longitudinal axis of the staple collation extends at a second angle relative to a driving axis of the staple collation.

3. The staple collation of claim 2, wherein the first angle is within a range from 10 degrees to 45 degrees.

4. The staple collation of claim 2, wherein the second angle is within a range from 65 degrees to 85 degrees.

5. The staple collation of claim 2, wherein:
    the first and second staple each has an outer width defined by the crown section, and
    the central plane of symmetry of the first staple is laterally offset from the central plane of symmetry of the second staple in the first direction by a distance.

6. The staple collation of claim 5, wherein the distance is 1 percent to 20 percent of the outer width of the first staple.

7. The staple collation of claim 5, wherein:
    a barb projects outward from each of the leg sections in a widthwise direction, and
    the adhesive material is coupled to the leg sections between the crown section and the barb.

8. The staple collation of claim 7, wherein an outer width defined between the barb on each of the leg sections is less than or equal to the outer width of the crown section.

9. The staple collation of claim 1, wherein the first and second staple each has a length and the second staple is vertically offset from the first staple in the second direction by a distance.

10. The staple collation of claim 9, wherein the distance is 1 percent to 10 percent of the length of the first staple.

11. The staple collation of claim 1, wherein the crown sections of the first and second staples are diamond-shaped with a first curve, a second curve, and a third curve representing three points of a diamond.

12. The staple collation of claim 11, wherein each of the first curve, the second curve, and the third curve is defined by an identical radius.

13. A powered fastener driver comprising:
    a housing defining a handle portion and a cylinder housing portion;
    a driver blade extending longitudinally along the cylinder housing portion and defining a driving axis;
    a nosepiece;
    a magazine obliquely extending from the nosepiece in both a plane containing the driving axis and a plane that is perpendicular to the driving axis,
    a staple collation housed within the magazine, the staple collation comprising;
        a first staple positioned within the nosepiece, the first staple being aligned with the driving axis,
        an identical second staple adjacent the first staple, and
        an adhesive material coupling the first staple to the second staple,
        wherein each of the first staple and the second staple includes
            a crown section having opposite ends, and
            a pair of leg sections extending from the opposite ends of the crown section,
    wherein the second staple is offset from the first staple in a first, lateral direction, and wherein the second staple is offset from the first staple in a second, vertical direction that is perpendicular to the lateral direction.

14. The powered fastener driver of claim 13, wherein:
    when viewed in an end view, a longitudinal axis of the magazine intersects the driving axis and extends at a first angle relative to a vertical reference plane containing the driving axis and bisecting the cylinder housing portion, and
    when viewed in a side view, the longitudinal axis of the magazine extends at a second angle relative to the driving axis.

15. The powered fastener driver of claim 14, wherein the first angle is within a range from 10 degrees to 45 degrees.

16. The powered fastener driver of claim 14, wherein the second angle is within a range from 10 degrees to 45 degrees.

17. The powered fastener driver of claim 14, wherein:
    when viewed in a plan view, a longitudinal axis of the staple collation extends at a third angle relative to a central plane of symmetry of the first staple and intersects a central plane of symmetry of the second staple, and when viewed in a side view, the longitudinal axis of the staple collation extends at a fourth angle relative to the driving axis.

18. The powered fastener driver of claim 13, wherein:
the first and second staple each has an outer width defined by the crown section, and
the central plane of symmetry of the first staple is laterally offset from the central plane of symmetry of the second staple in the first direction by a distance.

19. The powered fastener driver of claim 18, wherein the distance is 1 percent to 20 percent of the outer width of the first staple.

20. The powered fastener driver of claim 13, wherein:
a barb projects outward from each of the leg sections in a widthwise direction, and
the adhesive material is coupled to the leg sections of the staple between the crown section and the barb.

21. A staple collation comprising:
a first staple;
an identical second staple adjacent the first staple; and
an adhesive material coupling the first staple to the second staple,
wherein each of the first staple and the second staple includes
a crown section having diamond shaped with a first curve, a second curve, and a third curve representing three points of a diamond, the crown section having opposite ends,
a pair of leg sections extending from the opposite ends of the crown section, and
a barb projecting outward from each of the leg sections in a widthwise direction.

22. The staple collation of claim 21, wherein each of the first curve, the second curve, and the third curve is defined by an identical radius.

23. The staple collation of claim 21, wherein the first curve is positioned at an apex of the crown section that is bisected by a central plane of symmetry.

24. The staple collation of claim 23, wherein the first curve is connected to the second curve and the third curve via respective straight segments.

25. The staple collation of claim 24, wherein each of the straight segments is oriented at an angle within a range from 40 degrees to 50 degrees relative to the central plane of symmetry.

26. The staple collation of claim 21, wherein the leg sections include leg segments that extend from the crown section and are parallel with each other.

27. The staple collation of claim 26, wherein the leg segments include an adhesive coating.

28. The staple collation of claim 21, wherein the adhesive material is coupled to the leg sections of the staple between the crown section and the barb.

29. The staple collation of claim 21, wherein the crown section has an outer width that is greater than an outer width of the leg sections.

30. The staple collation of claim 29, wherein an outer width defined by the barbs is greater than the outer width of the leg sections and is less than or equal to the outer width of the crown section.

31. The staple collation of claim 21, wherein a distal end of one of the leg sections has a forward-facing inclined face, and wherein the distal end of the other leg section has a rearward-facing inclined face.

* * * * *